US012523071B2

(12) United States Patent
Sanchez Rojas et al.

(10) Patent No.: US 12,523,071 B2
(45) Date of Patent: Jan. 13, 2026

(54) VEHICLE LATCH WITH OPEN ASSIST

(71) Applicant: INTEVA PRODUCTS, LLC, Troy, MI (US)

(72) Inventors: Hector Sanchez Rojas, Chihuahua (MX); Pedro Alfredo Alvarado Heredia, Chihuahua (MX); Ari Yussel Mino Ramirez, Chihuahua (MX); Carlos Isaac Tostado Bocanegra, Chihuahua (MX); Donald Michael Perkins, Warren, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 18/745,256

(22) Filed: Jun. 17, 2024

(65) Prior Publication Data

US 2024/0418015 A1    Dec. 19, 2024

Related U.S. Application Data

(60) Provisional application No. 63/521,598, filed on Jun. 16, 2023.

(51) Int. Cl.
    *E05B 81/20*     (2014.01)
    *E05B 77/26*     (2014.01)
    (Continued)

(52) U.S. Cl.
    CPC .............. *E05B 81/20* (2013.01); *E05B 77/26* (2013.01); *E05B 81/16* (2013.01); *E05B 81/36* (2013.01)

(58) Field of Classification Search
CPC .......... E05B 81/14; E05B 81/18; E05B 81/20; E05B 81/34; E05B 81/36; E05B 81/42; E05B 81/46; E05B 77/26
See application file for complete search history.

(56) References Cited

U.S. PATENT DOCUMENTS

| | | | | |
|---|---|---|---|---|
| 7,540,541 | B2 * | 6/2009 | Yoneyama | E05B 83/40 |
| | | | | 292/201 |
| 8,740,263 | B2 * | 6/2014 | Singh | E05B 85/243 |
| | | | | 292/216 |

(Continued)

*Primary Examiner* — Kristina R Fulton
*Assistant Examiner* — Noah Horowitz
(74) *Attorney, Agent, or Firm* — CANTOR COLBURN LLP

(57) ABSTRACT

A vehicle latch assembly, including: a remote cinching actuator; and a vehicle latch, the vehicle latch including: a latch housing; a claw pivotally mounted to the latch housing; a cinching lever pivotally mounted to the latch housing; a push out lever pivotally mounted to the cinching lever; an actuator housing secured to the latch housing; an inside release lever pivotally mounted to the actuator housing; a bypass lever pivotally mounted to the inside release lever, the bypass lever movable between a first position and a second position with respect to the inside release lever; a power release lever pivotally mounted to the actuator housing; a pawl, the power release lever being operably coupled to the pawl wherein movement of the power release lever causes the pawl move between an engaged position and a disengaged position, the pawl preventing rotation of the claw when the pawl is in the engaged position and the pawl does not prevent rotation of the claw when the pawl is in the disengaged position; wherein the bypass lever has an arm portion that passes through an opening in the inside release lever, the arm portion having a mid portion and a distal end portion, the mid portion engages a tab of the power release lever when the bypass lever is in the first position such that movement of the inside release lever causes movement of the power release lever and the pawl and the mid portion does not engage the tab of the power release lever when the bypass lever is in the second position such that movement of the inside release lever does not cause movement of the power release lever and the pawl; a sector gear pivotally mounted to the actuator housing; a child lock link operably coupled to the distal end portion at one end the sector gear at an opposite end, wherein movement of the sector gear causes the bypass lever to move between the first position and the second position; and wherein the remote cinching actuator is operably coupled the cinching lever by a cable, wherein actuation of the remote cinching actuator causes (Continued)

rotation of the cinching lever and during rotation of the cinching lever, the push out lever travels in one of a bypass path wherein the push out lever does not contact the claw and a push out path wherein the push out lever contacts the claw and provides an opening force to the claw.

20 Claims, 26 Drawing Sheets

(51) Int. Cl.
  *E05B 81/16* (2014.01)
  *E05B 81/36* (2014.01)

(56) References Cited

U.S. PATENT DOCUMENTS

| | | | |
|---|---|---|---|
| 9,163,434 B2* | 10/2015 | Uehara | E05B 77/265 |
| 10,590,681 B2* | 3/2020 | Jeong | E05B 81/34 |
| 10,876,326 B2* | 12/2020 | Barmscheidt | E05B 81/66 |
| 10,920,464 B2* | 2/2021 | Im | E05B 81/06 |
| 11,118,379 B2* | 9/2021 | Barmscheidt | E05B 81/20 |
| 11,274,477 B2* | 3/2022 | Cumbo | E05B 81/20 |
| 11,674,338 B2* | 6/2023 | Tomaszewski | E05B 83/36 |
| | | | 292/201 |
| 11,859,416 B2* | 1/2024 | Johann | E05B 81/14 |
| 11,939,798 B2* | 3/2024 | Kimura | E05B 83/40 |
| 12,264,514 B2* | 4/2025 | Sanchez Rojas | E05B 81/30 |
| 2025/0223848 A1* | 7/2025 | Sanchez Rojas | E05B 81/06 |

\* cited by examiner

VEHICLE LATCH WITH OPEN ASSIST

CROSS REFERENCE TO RELATED APPLICATIONS

This application claims the benefit of U.S. Provisional Patent Application No. 63/521,598 filed on Jun. 16, 2023, the entire contents of which are incorporated herein by reference thereto.

BACKGROUND

Exemplary embodiments of the present disclosure pertain to the art of vehicle latches.

In a vehicle door latch with a power release mechanism, the associated vehicle door some times does not transition from latched position to an open position this may be due to the vehicle door being frozen to the opening the vehicle door is secured to. This may be caused by moisture located between the seals of the door and the vehicle body that freezes in cold temperatures.

As such and having the ability of unjamming the vehicle door under extreme freezing conditions has become a real need in the market. For side door latches, ice might build up around the door, making it difficult for the passenger to pull the handle and open the door. As such, it is desirable to provide the latch assembly with a mechanism that will be capable of assisting in the opening of the vehicle door, making it easier to enter their vehicle under extreme cold temperatures.

BRIEF DESCRIPTION

Disclosed is a vehicle latch assembly, including: a remote cinching actuator; and a vehicle latch, the vehicle latch including: a latch housing; a claw pivotally mounted to the latch housing; a cinching lever pivotally mounted to the latch housing; a push out lever pivotally mounted to the cinching lever; an actuator housing secured to the latch housing; an inside release lever pivotally mounted to the actuator housing; a bypass lever pivotally mounted to the inside release lever, the bypass lever movable between a first position and a second position with respect to the inside release lever; a power release lever pivotally mounted to the actuator housing; a pawl, the power release lever being operably coupled to the pawl wherein movement of the power release lever causes the pawl move between an engaged position and a disengaged position, the pawl preventing rotation of the claw when the pawl is in the engaged position and the pawl does not prevent rotation of the claw when the pawl is in the disengaged position; wherein the bypass lever has an arm portion that passes through an opening in the inside release lever, the arm portion having a mid portion and a distal end portion, the mid portion engages a tab of the power release lever when the bypass lever is in the first position such that movement of the inside release lever causes movement of the power release lever and the pawl and the mid portion does not engage the tab of the power release lever when the bypass lever is in the second position such that movement of the inside release lever does not cause movement of the power release lever and the pawl; a sector gear pivotally mounted to the actuator housing; a child lock link operably coupled to the distal end portion at one end the sector gear at an opposite end, wherein movement of the sector gear causes the bypass lever to move between the first position and the second position; and wherein the remote cinching actuator is operably coupled the cinching lever by a cable, wherein actuation of the remote cinching actuator causes rotation of the cinching lever and during rotation of the cinching lever, the push out lever travels in one of a bypass path wherein the push out lever does not contact the claw and a push out path wherein the push out lever contacts the claw and provides an opening force to the claw.

In addition to one or more of the features described above, or as an alternative to any of the foregoing embodiments, a motor is operably coupled to the sector gear, wherein actuation of the motor causes movement of the sector gear.

In addition to one or more of the features described above, or as an alternative to any of the foregoing embodiments, the push out lever is spring biased towards the bypass path by a push out lever spring.

In addition to one or more of the features described above, or as an alternative to any of the foregoing embodiments, the vehicle latch further includes a clutch lever, the clutch lever being movable between a bypass position and a non bypass position, wherein when the clutch lever is in the non bypass position the clutch lever causes the push out lever to travel in the push out path when the cinching lever is rotated.

In addition to one or more of the features described above, or as an alternative to any of the foregoing embodiments, the clutch lever is spring biased into the bypass position by a clutch lever spring.

In addition to one or more of the features described above, or as an alternative to any of the foregoing embodiments, the push out lever is spring biased towards the bypass path by a push out lever spring.

In addition to one or more of the features described above, or as an alternative to any of the foregoing embodiments, the push out lever further includes a feature that engages the clutch lever when the clutch lever is in the non bypass position in order to guide the push out lever into the push out path.

In addition to one or more of the features described above, or as an alternative to any of the foregoing embodiments, the vehicle latch further includes an override link, a power release lever and a pawl, the power release lever being operably coupled to the pawl wherein movement of the power release lever causes the pawl move between an engaged position and a disengaged position, the pawl preventing rotation of the claw when the pawl is in the engaged position and the pawl does not prevent rotation of the claw when the pawl is in the disengaged position and the override link being operably coupled to the pawl such that movement of the pawl causes movement of the override link and the override link is operably coupled to the clutch lever such that when the pawl is in the disengaged position the clutch lever is in the non bypass position due to movement of the override link.

In addition to one or more of the features described above, or as an alternative to any of the foregoing embodiments, the clutch lever has a tab that is received within a recess of the override link such that as the override link is moved the clutch lever will rotate between the non bypass position and the bypass position.

In addition to one or more of the features described above, or as an alternative to any of the foregoing embodiments, the clutch lever spring is secured to the override link at one end and the clutch lever at another end.

In addition to one or more of the features described above, or as an alternative to any of the foregoing embodiments, the push out lever spring is secured to the cinching lever at one end and the push out lever at another end.

In addition to one or more of the features described above, or as an alternative to any of the foregoing embodiments, the push out lever spring is secured to the cinching lever at one end and the push out lever at another end.

In addition to one or more of the features described above, or as an alternative to any of the foregoing embodiments, the cinching lever further includes a cinch link pivotally mounted to the cinching lever, wherein the cinch link contacts the claw and provides a closing force to the claw when the cinching lever is rotated and the claw is in a secondary position and the pawl is in the engaged position.

In addition to one or more of the features described above, or as an alternative to any of the foregoing embodiments, the clutch lever has a guiding feature that contacts a portion of the latch housing when the pawl is in the engaged position such that the clutch lever cannot rotate into the non bypass position from the bypass position.

In addition to one or more of the features described above, or as an alternative to any of the foregoing embodiments, the guiding feature does not contact the portion of the latch housing when the pawl is in the disengaged position such that the clutch lever can rotate into the non bypass position from the bypass position.

Also disclosed is a method opening a vehicle latch of a vehicle latch assembly, including: actuating a remote cinching actuator of the vehicle latch assembly when a pawl of the vehicle latch is in a disengaged position with respect to a claw of the vehicle latch and the claw of the vehicle latch is in a latched position, wherein the remote cinching actuator is operably coupled a cinching lever of the vehicle latch by a cable and actuation of the remote cinching actuator causes rotation of the cinching lever and during rotation of the cinching lever, a push out lever rotatably mounted to the cinching lever travels in a push out path wherein the push out lever contacts the claw and provides an opening force to the claw; and moving a bypass lever pivotally mounted to an inside release lever of the vehicle latch between a first position and a second position with respect to the inside release lever, wherein the bypass lever has an arm portion that passes through an opening in the inside release lever, the arm portion having a mid portion and a distal end portion, the mid portion engages a tab of a power release lever of the vehicle latch such that when the bypass lever is in the first position, movement of the inside release lever causes movement of the power release lever and a pawl of the vehicle latch and the mid portion does not engage the tab of the power release lever when the bypass lever is in the second position such that movement of the inside release lever does not cause movement of the power release lever and the pawl, the power release lever being operably coupled to the pawl such that movement of the power release lever causes the pawl move between an engaged position and a disengaged position, the pawl preventing rotation of the claw when the pawl is in the engaged position and the pawl does not prevent rotation of the claw when the pawl is in the disengaged position.

In addition to one or more of the features described above, or as an alternative to any of the foregoing embodiments, actuation of the remote cinching actuator when the pawl of the vehicle latch is in an engaged position with respect to the claw of the vehicle latch causes rotation of the cinching lever and during rotation of the cinching lever, the push out lever rotatably mounted to the cinching lever travels in a bypass path wherein the push out lever does not contact the claw.

In addition to one or more of the features described above, or as an alternative to any of the foregoing embodiments, actuation of the remote cinching actuator when the pawl of the vehicle latch is in the engaged position with respect to the claw of the vehicle latch and the claw is in a secondary position where the pawl contacts the claw causes rotation of the cinching lever and during rotation of the cinching lever, a cinch link pivotally mounted to the cinching lever contacts the claw and rotates the claw into a primary position.

In addition to one or more of the features described above, or as an alternative to any of the foregoing embodiments, the push out lever is spring biased towards the bypass path by a push out lever spring.

In addition to one or more of the features described above, or as an alternative to any of the foregoing embodiments, the vehicle latch further includes a clutch lever, the clutch lever being movable between a bypass position and a non bypass position, wherein when the clutch lever is in the non bypass position the clutch lever causes the push out lever to travel in the push out path when the cinching lever is rotated and wherein the clutch lever is spring biased into the bypass position by a clutch lever spring.

DETAILED DESCRIPTION

A detailed description of one or more embodiments of the disclosed apparatus and method are presented herein by way of exemplification and not limitation with reference to the attached Figures.

In accordance with the present disclosure, a push out lever is riveted and pivoted into a cinching lever. The push out lever will have a pivot riveted to it that will serve as a guiding feature. Also, the push out lever will be spring loaded or biased so that whenever the cinching lever rotates, it will fall into a bypass path unless it is redirected by a clutch lever.

As such and whenever the cinching lever rotates, the push out lever will follow two possible paths: a push out path or a bypass path. The path the push out lever will take will be determined by the latch position (e.g., hold open). The pivot riveted into the push out lever will slide through those paths.

The clutch lever is pivotally mounted to the latch and will move whenever the latch is in the hold open position. As used herein, the hold open refers to when a pawl of the latch is held in a open or disengages position where the pawl does not contact the claw of the latch. This clutch lever will allow the push out lever to follow the push out path in the latch housing, thereby enabling the contact between the push out lever and the claw.

If the latch is not in the hold open or open position, the push out lever will only follow the bypass path.

Whenever the push out lever contacts a blank portion of the claw, it will have the capability of move it further than the secondary position.

This design also eliminates the possibility of having simultaneous operations of cinching and assisted opening at the same time.

Figure 1:
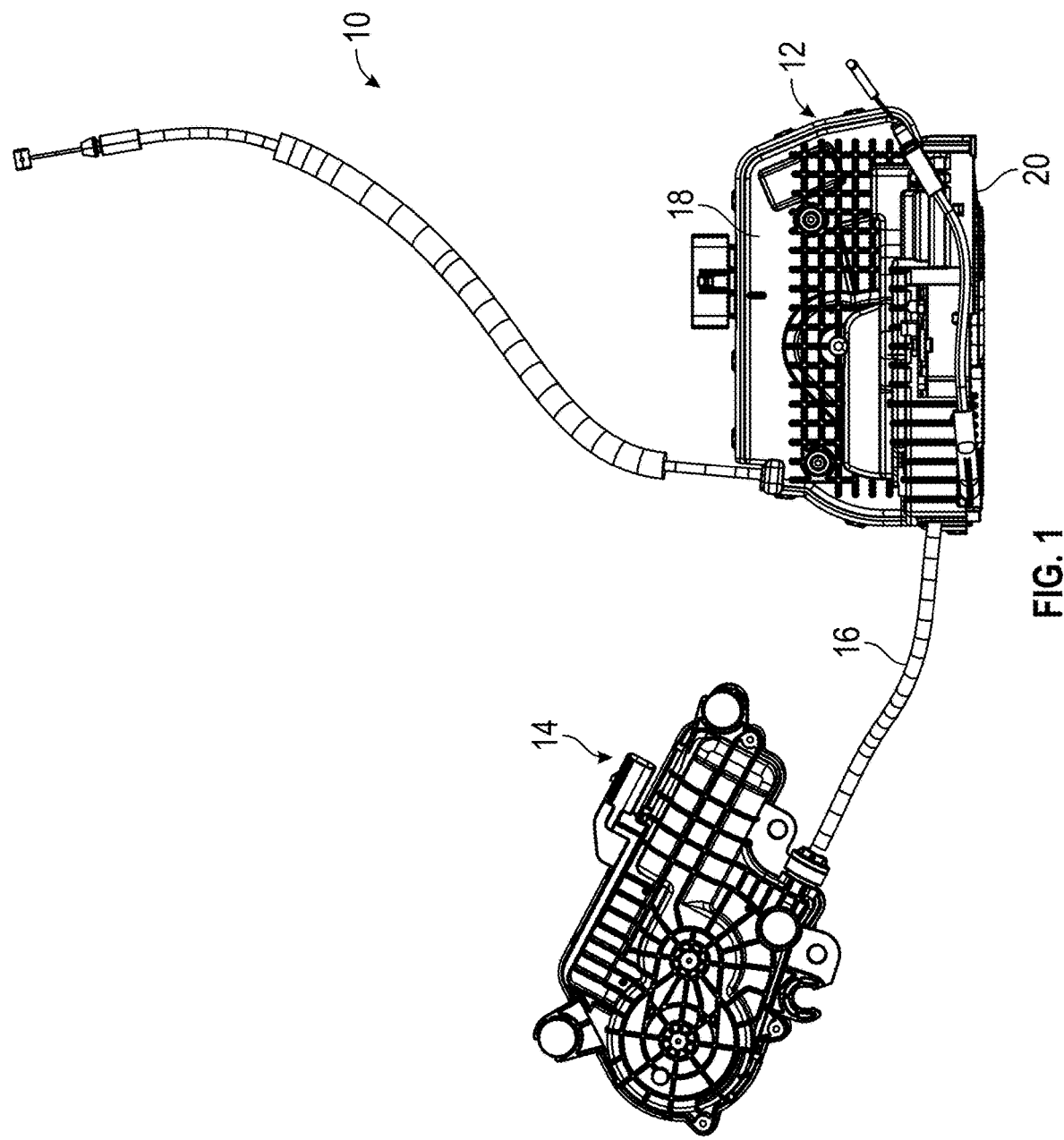
FIG. 1 is a view of vehicle latch assembly in accordance with the present disclosure.

Referring now to FIG. 1, a vehicle latch assembly 10 is illustrated. The vehicle latch assembly 10 includes a vehicle latch 12 operably coupled to a remote cinching actuator 14 by a cable that is slidably received in a cable sheath 16 that extends from the vehicle latch 12 to the remote cinching actuator 14. In one non-limiting embodiment, the vehicle latch assembly 10 is configured for use with a side door of a vehicle.

Figure 2:
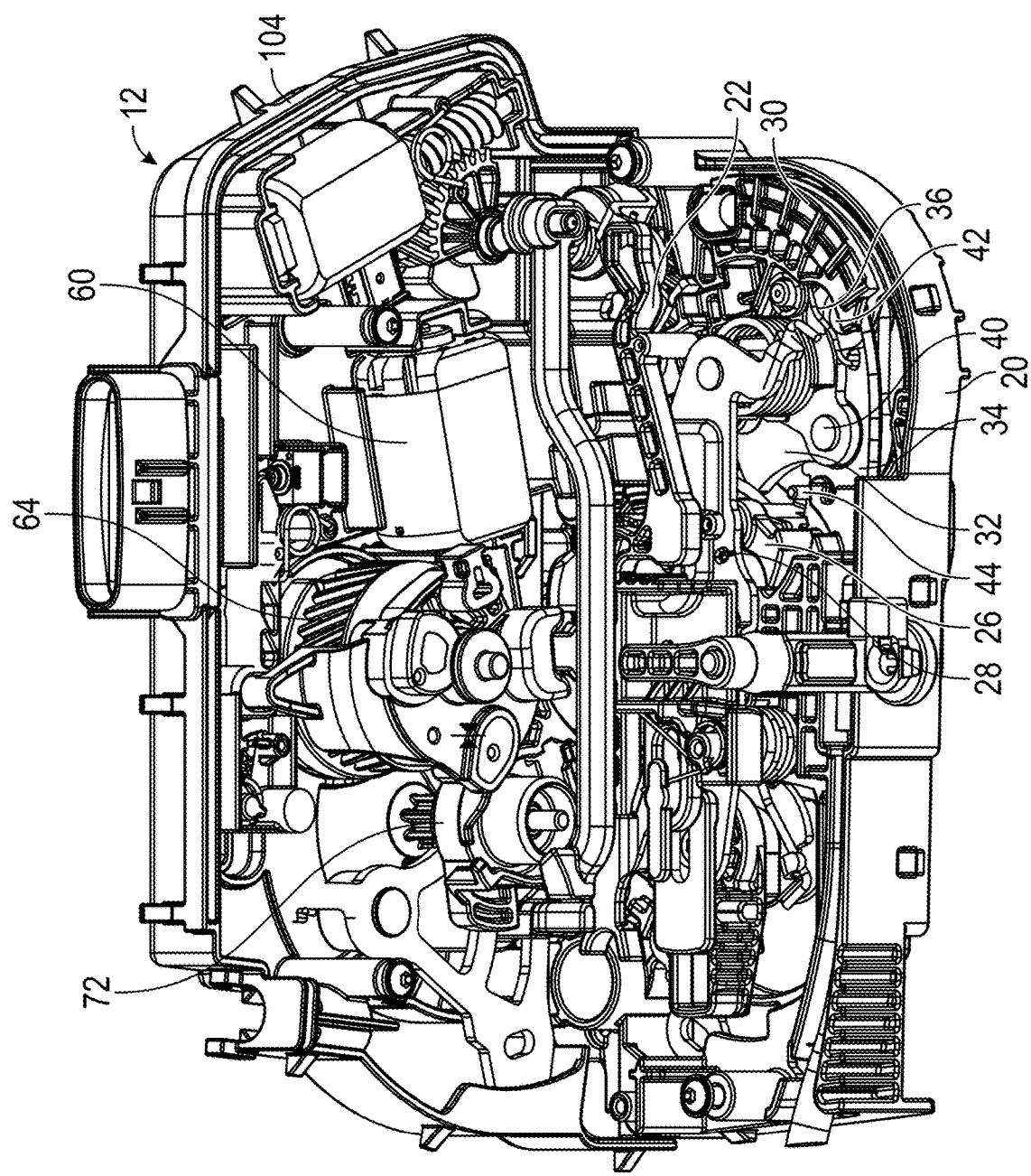
FIG. 2 is a view of interior components of a vehicle latch in accordance with the present disclosure.
Figure 3:
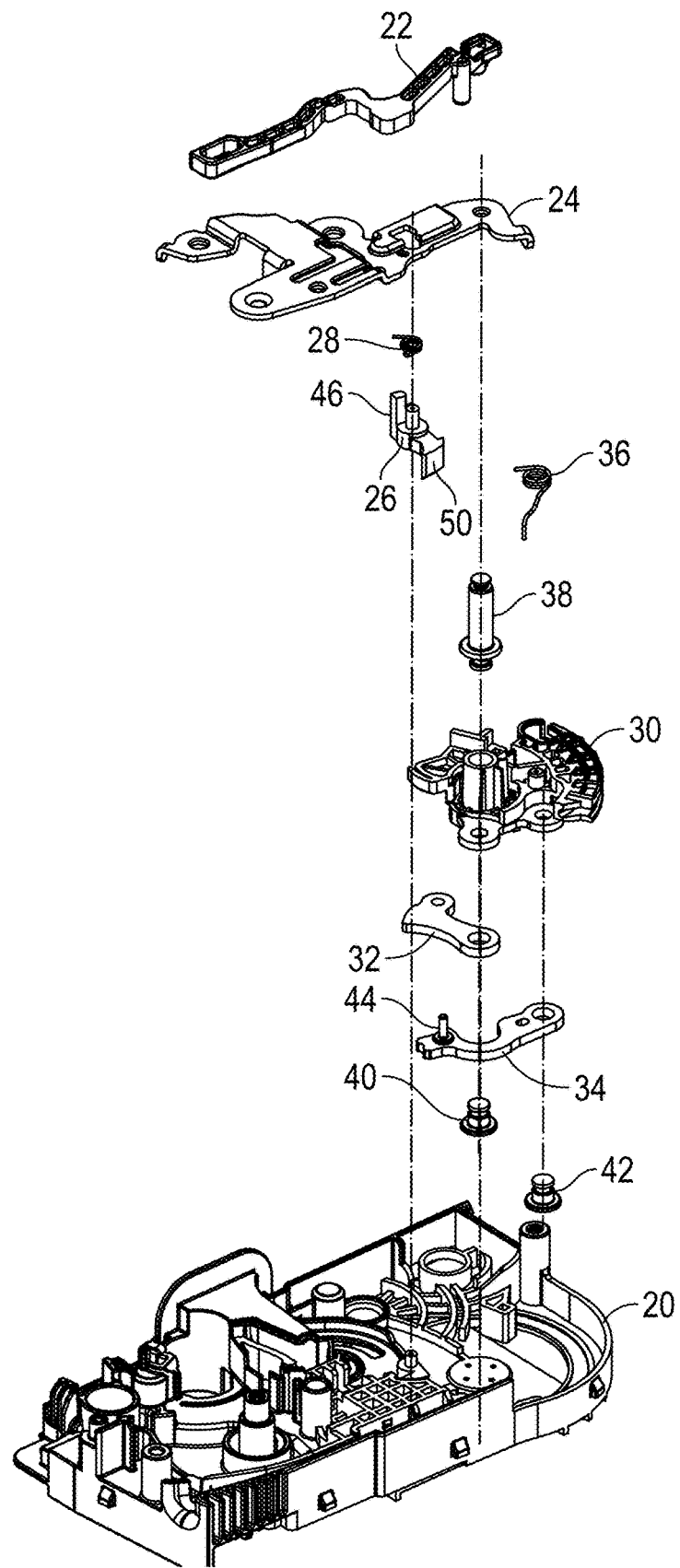
FIG. 3 is an exploded view of some interior components of a vehicle latch in accordance with the present disclosure.
Figure 4:
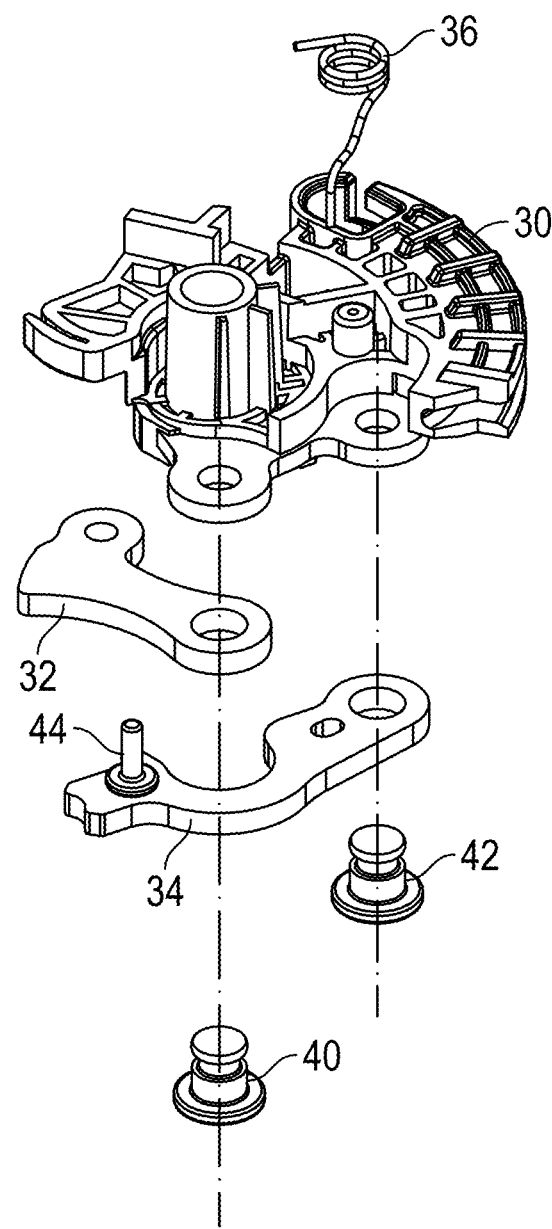
FIG. 4 is an enlarged view of some of the components illustrated in FIG. 3.

FIG. 2 illustrates the vehicle latch 12 with a cover 18 removed from a latch housing 20. Referring now to FIGS. 1-4 and in particular FIGS. 3 and 4 portions of the vehicle latch 12 are illustrated. In particular, FIGS. 3 and 4 illustrate exploded views of portions or components of the vehicle latch 12. Illustrated is an override link 22, a backplate 24, a clutch lever 26, a clutch lever spring 28, a cinching lever 30, a cinch link 32, a push out lever 34, and a push out lever spring 36. The cinching lever 30 is pivotally or rotationally mounted to the latch housing 20 by a pivot 38. The cinch link 32 is pivotally mounted to the cinching lever 30 by a rivet 40 and the push out lever 34 is pivotally mounted to the cinching lever 30 by a rivet 42. The push out lever 34 has a pivot or feature 44 riveted to it that will serve as a guiding feature for the push out lever 34. The clutch lever spring 28 provides a biasing force to the clutch lever 26 and the push out lever spring 36 provides a biasing force to the push out lever 34. The clutch lever 26 is pivotally mounted to the backplate 24. One end of the clutch lever spring 28 is in contact or secured to the clutch lever 26 and the other is in contact or secured to the backplate 24. One end of the push out lever spring 36 is in contact with or secured to the cinching lever 30 while another end of the push out lever spring 36 is in contact with or secured to the push out lever 34.

Figure 5:
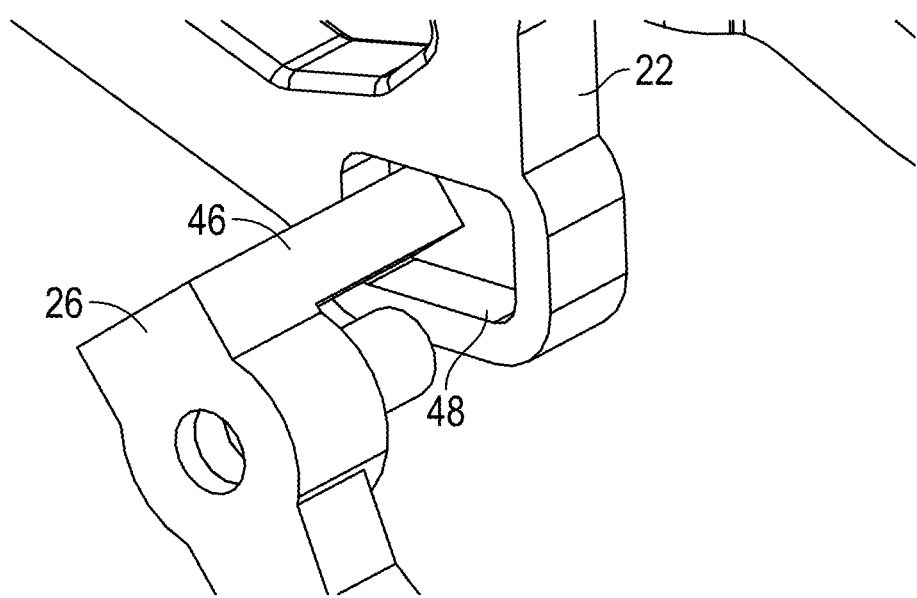
FIG. 5 is an enlarged view of some of the components of the vehicle latch illustrated in at least FIG. 2.

Referring now to FIG. 5, an enlarged portion of the override link 22 and the clutch lever 26 is illustrated. As shown, the clutch lever 26 has a tab or feature 46 that is received within a recess 48 of the override link 22 such that as the override link 22 is moved the clutch lever 26 will rotate. The clutch lever 26 also has a guiding feature or cam surface 50 that will interact with the pivot or feature 44 and cause the push out lever 34 to proceed along one of two paths, a by pass path or a open assist path depending on the location of the clutch lever 26.

Figure 6:
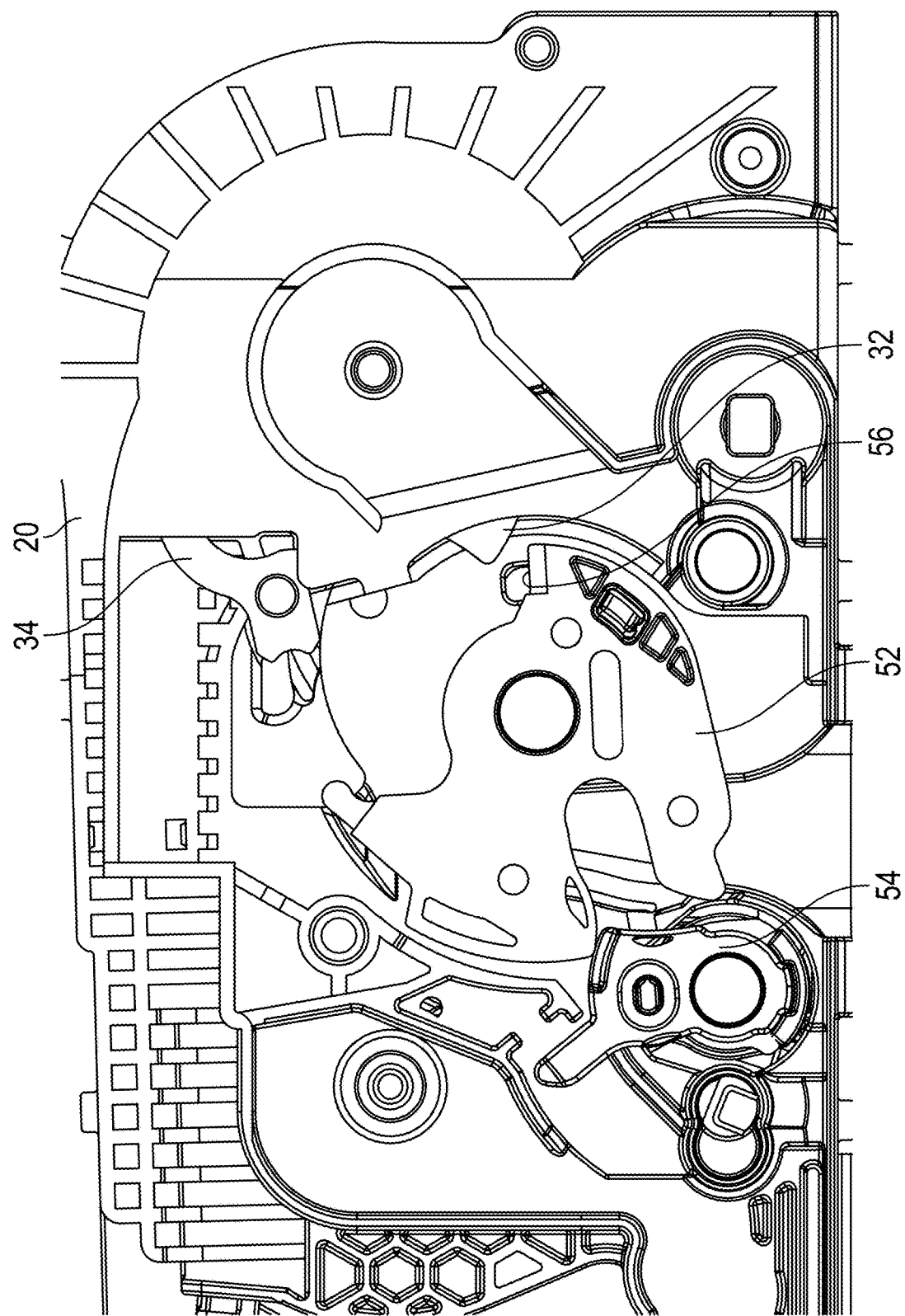
FIGS. 6-10A illustrated a cinching operation in accordance with the present disclosure.
Figure 7:
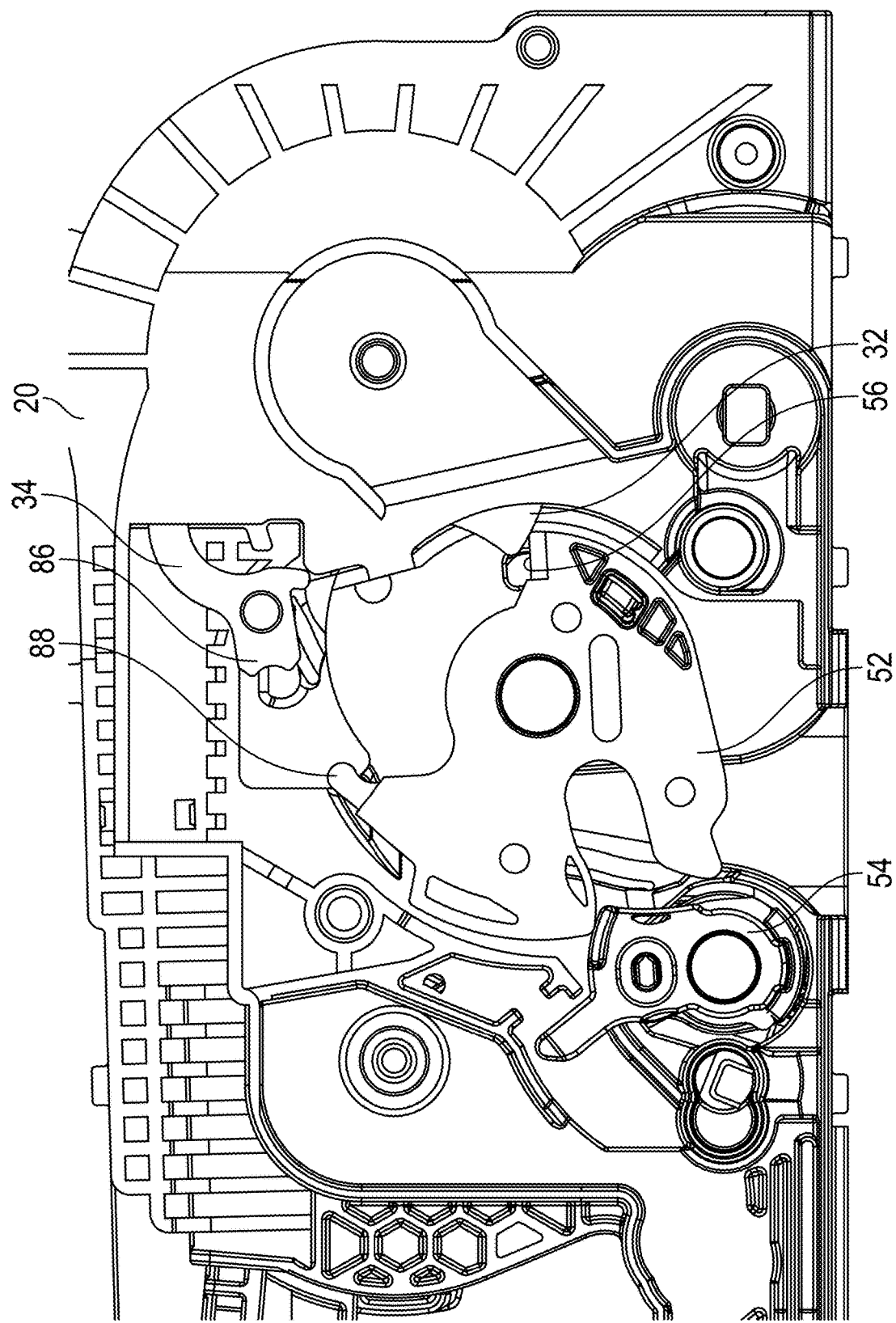
Figure 8:
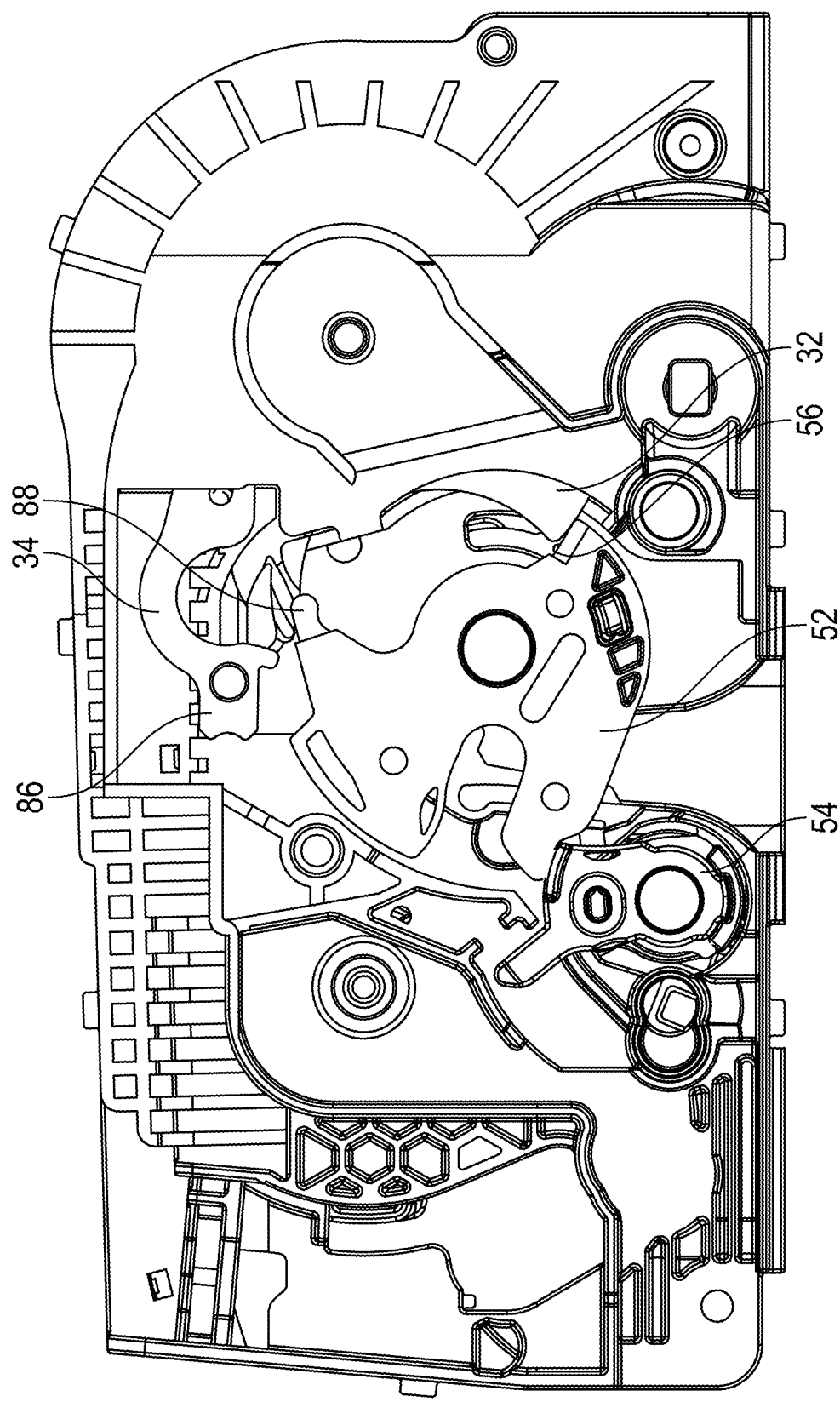

FIGS. 6-8, illustrate a cinching operation of the vehicle latch 12. FIGS. 6-8 are bottom views of the latch housing 20 (with respect to the view of at least FIGS. 1-3) with a mounting plate removed. In FIG. 6, a claw 52 is in a secondary position and a pawl 54 has engaged the claw 52 so that it cannot rotate into an open position or counter clockwise from the position illustrated in FIG. 6.

As used herein and as known in the related arts, a primary position of the claw 52 refers to a closed position of the vehicle latch 12 wherein the claw 52 retains a striker (not shown) and the door the vehicle latch 12 is associated with is fully closed and the pawl 54 is in an engaged position that retains the claw 52 in the closed or primary position. As used herein and as known in the related arts, the open position of the vehicle latch 12 refers to a position where the claw 52 no longer retains the striker and the door the vehicle latch 12 is associated with is open or openable and the pawl 54 has been moved to a disengaged position so that the claw 52 can rotate from the closed or primary position to the open position. As used herein and as known in the related arts, the secondary position refers to a partially closed position of the vehicle latch 12 wherein the claw 52 retains the striker and the door the vehicle latch 12 is associated with is partially closed and the pawl 54 is in an engaged position that retains the claw 52 in the second position.

As such, the vehicle latch 12 is configured to perform a motorized cinching operation wherein the claw 52 is pushed from the second position to the primary or closed position.

Figure 9:
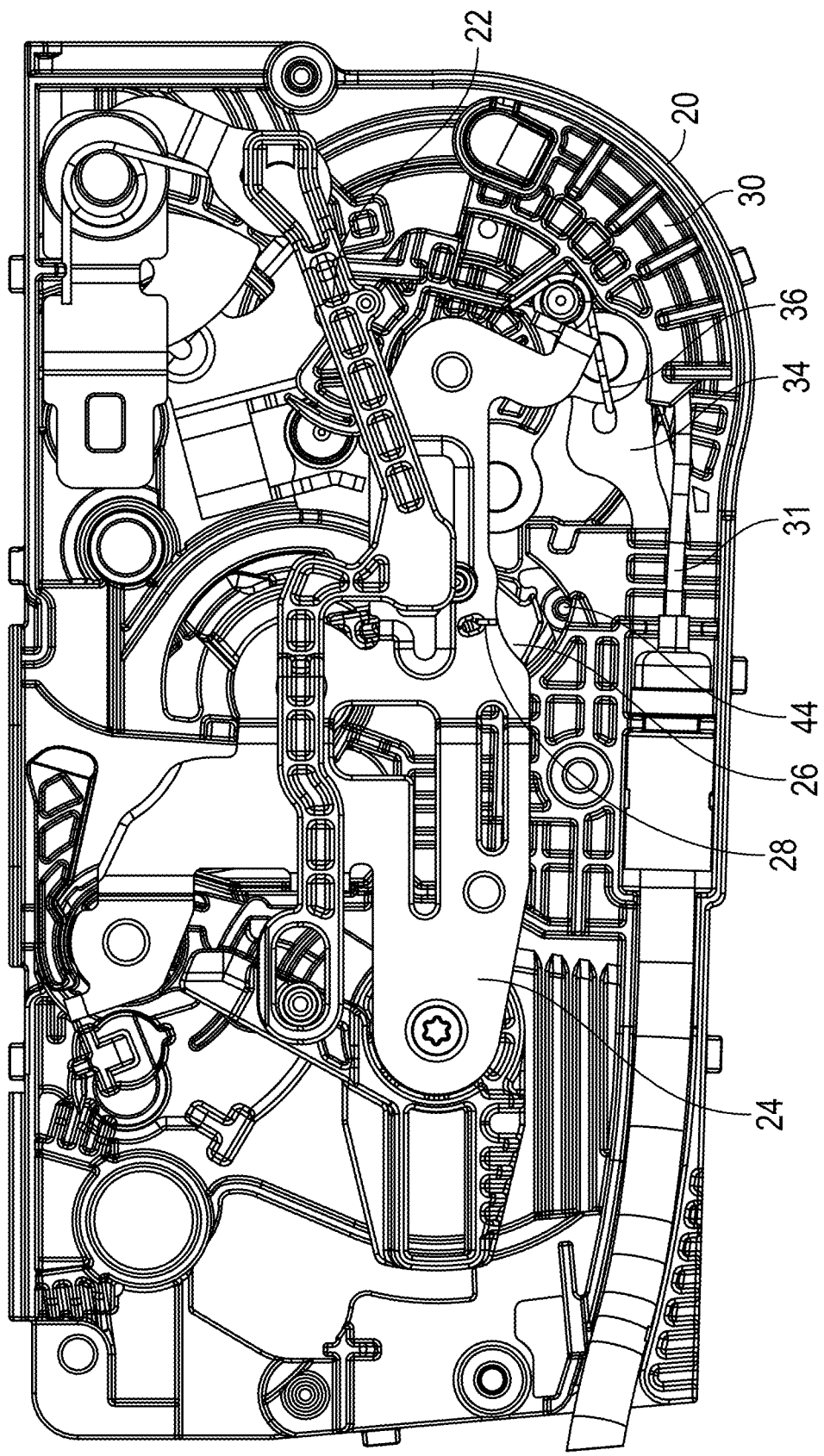
Figure 9A:
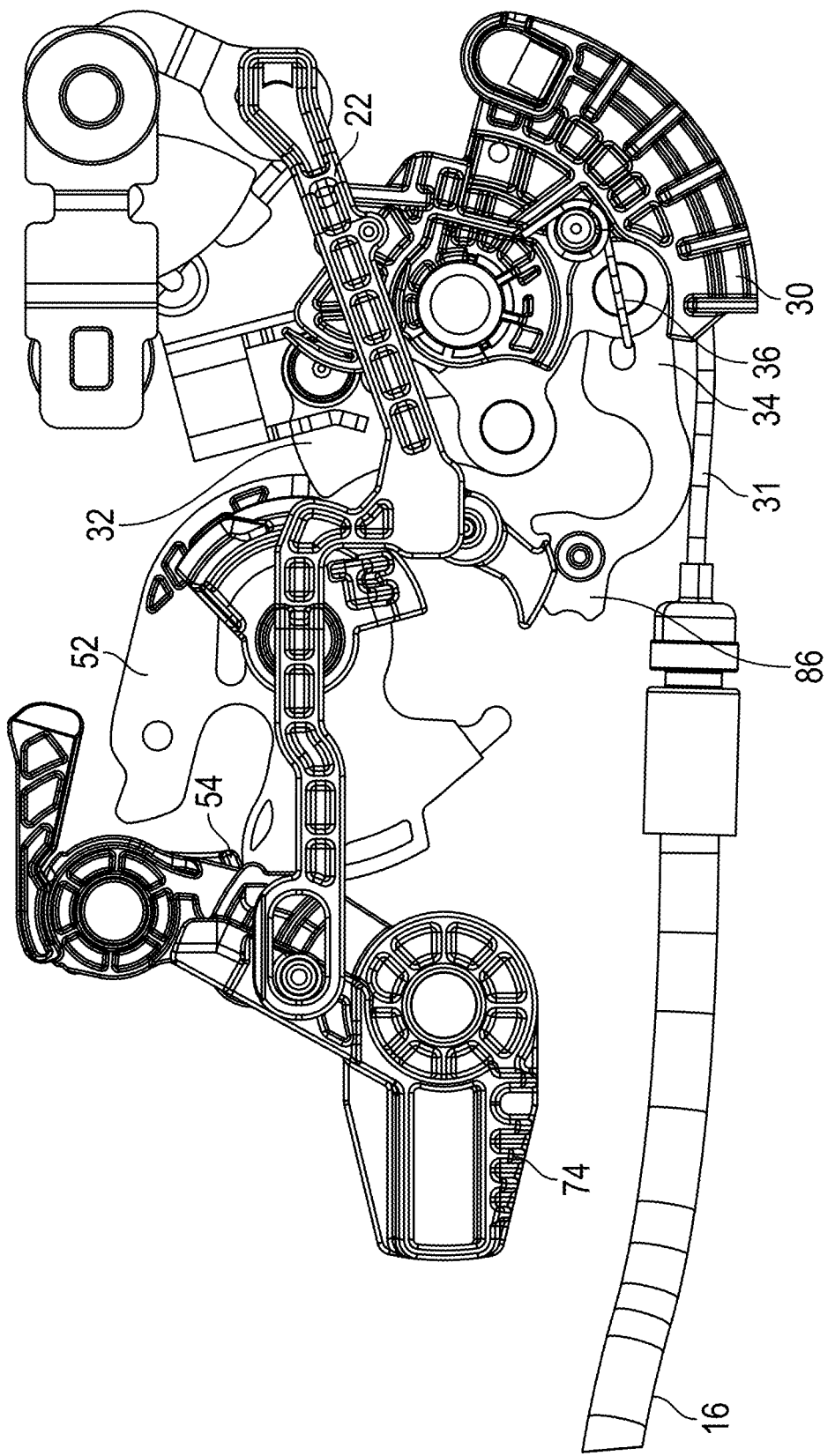
Figure 10:
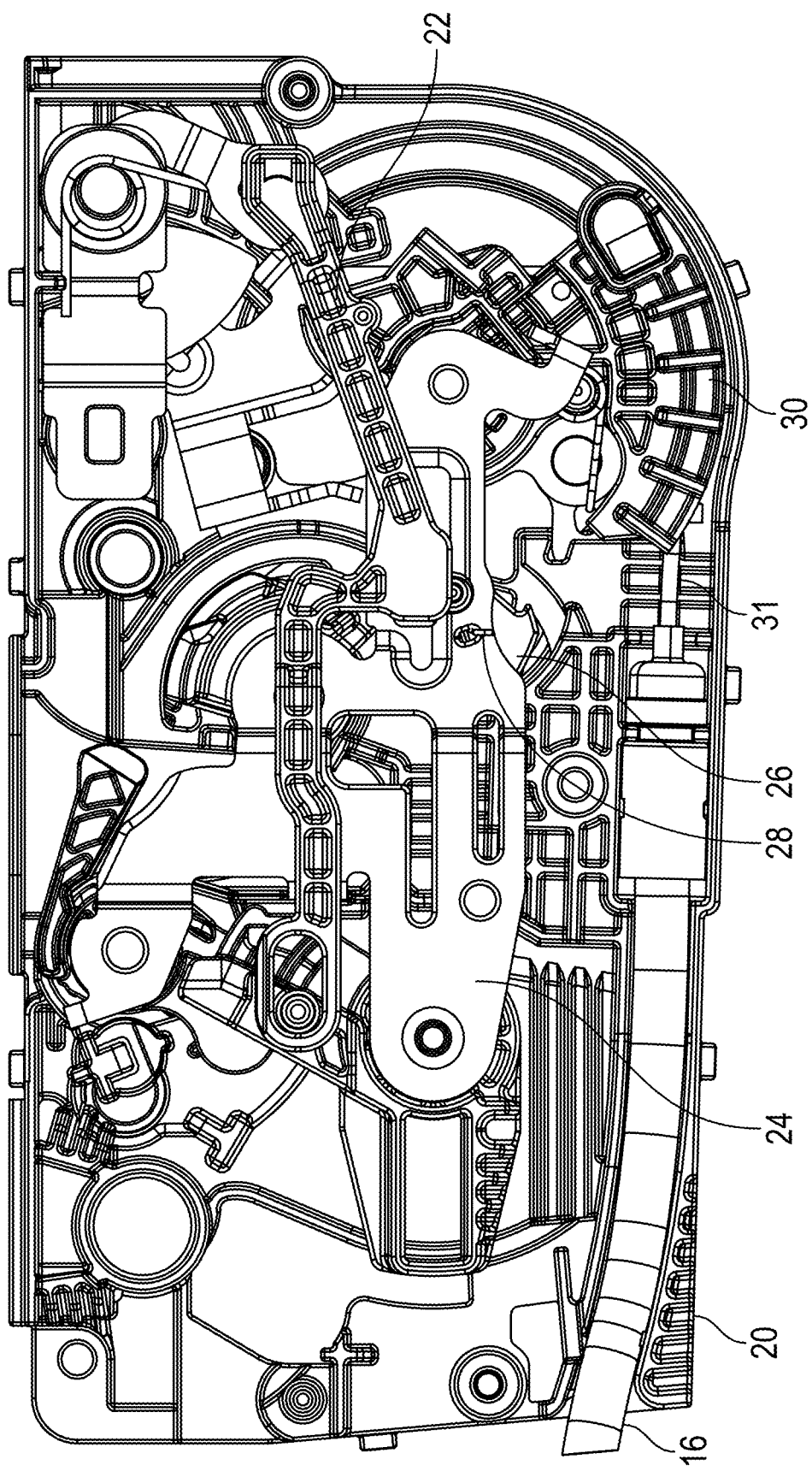
Figure 10A:
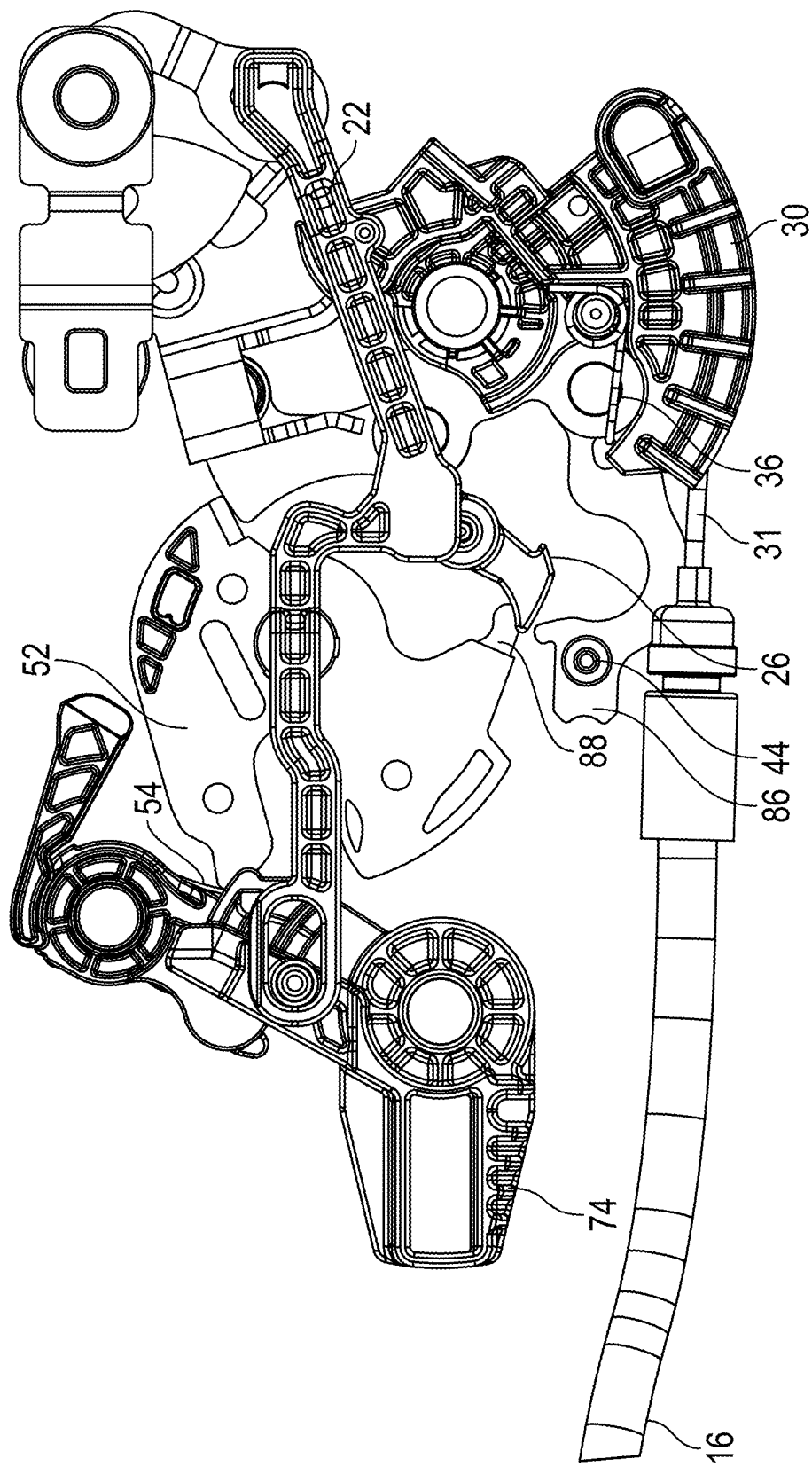

In FIG. 7, a cinching operation has begun, the cinching operation may be referred to as when a rotational force is applied to the cinching lever 30 by cable 31 that is secured to the cinching lever 30 at one end and a drum (not shown) of the remote cinching actuator 14 that is driven or rotated by a motor (not shown) of the remote cinching actuator 14 such that the cable 31 is wind upon the drum and the cinching lever is rotated. During this movement, the cinch link 32 contacts a surface 56 of the claw 52. As such, the cinch link 32 will rotate the claw into the primary or fully latched position illustrated in FIG. 8. In this position, the pawl 54 will retain the claw 52 in the primary or fully latched position. During this movement, the push out lever 34 follows a bypass path and does not contact the claw 52. This is due to the biasing force of push out lever spring 36 and the pivot or feature 44 is not redirected by the guiding feature or cam surface 50 of the clutch lever 26. This is also due to the fact that the clutch lever 26 has not been moved by the override link. See also FIGS. 9 and 10, which shows this movement on an opposite side of the vehicle latch 12 (with the cover removed) with respect to at least FIGS. 6-8. See also FIGS. 9A and 10A, which only some of the components of the vehicle latch 12 illustrate this movement on an opposite side of the vehicle latch 12 (with the cover removed) with respect to at least FIGS. 6-8.

Figure 11:
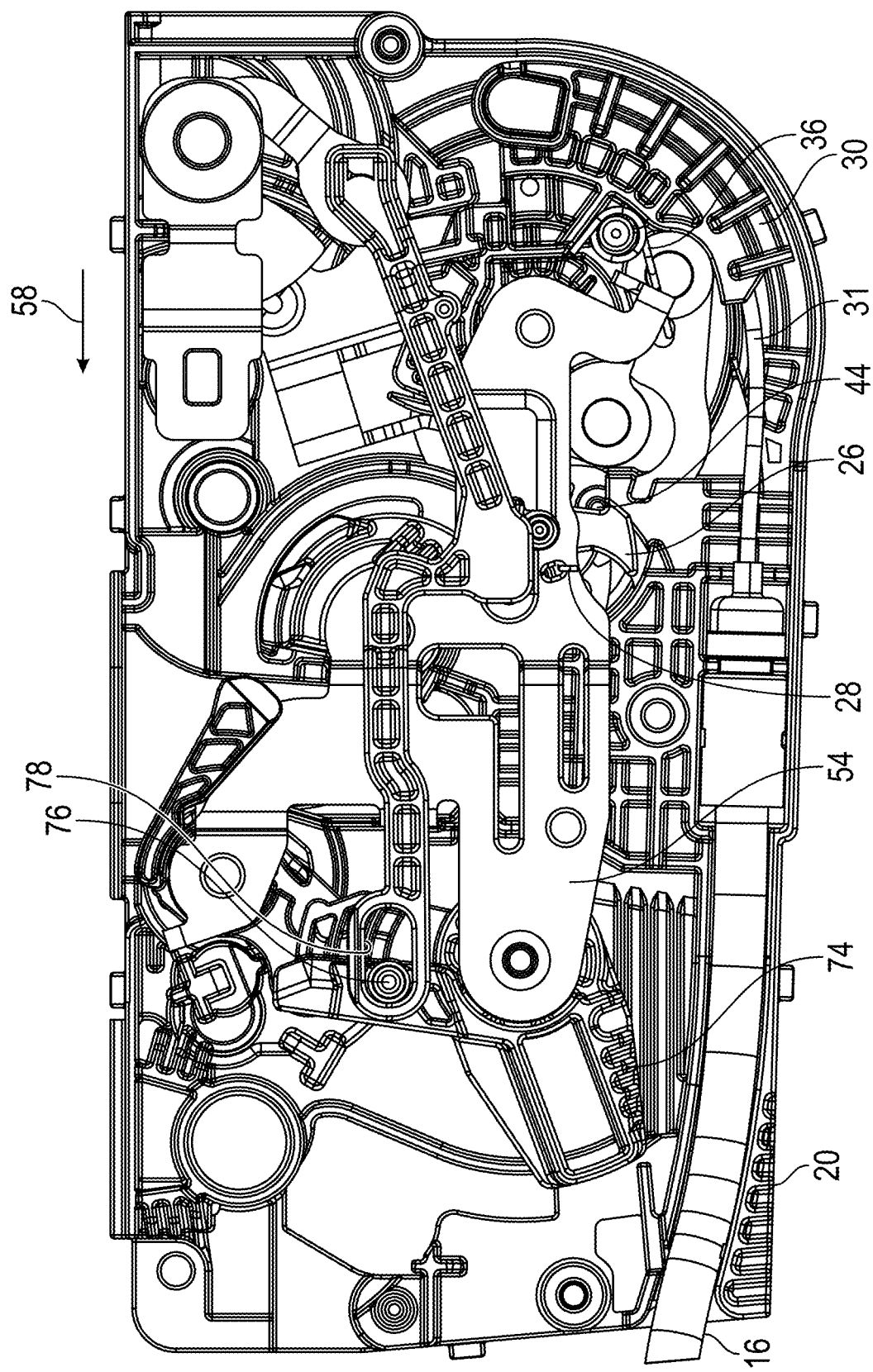
FIGS. 11-16B illustrate an open assist of the vehicle latch in accordance with the present disclosure.
Figure 12:
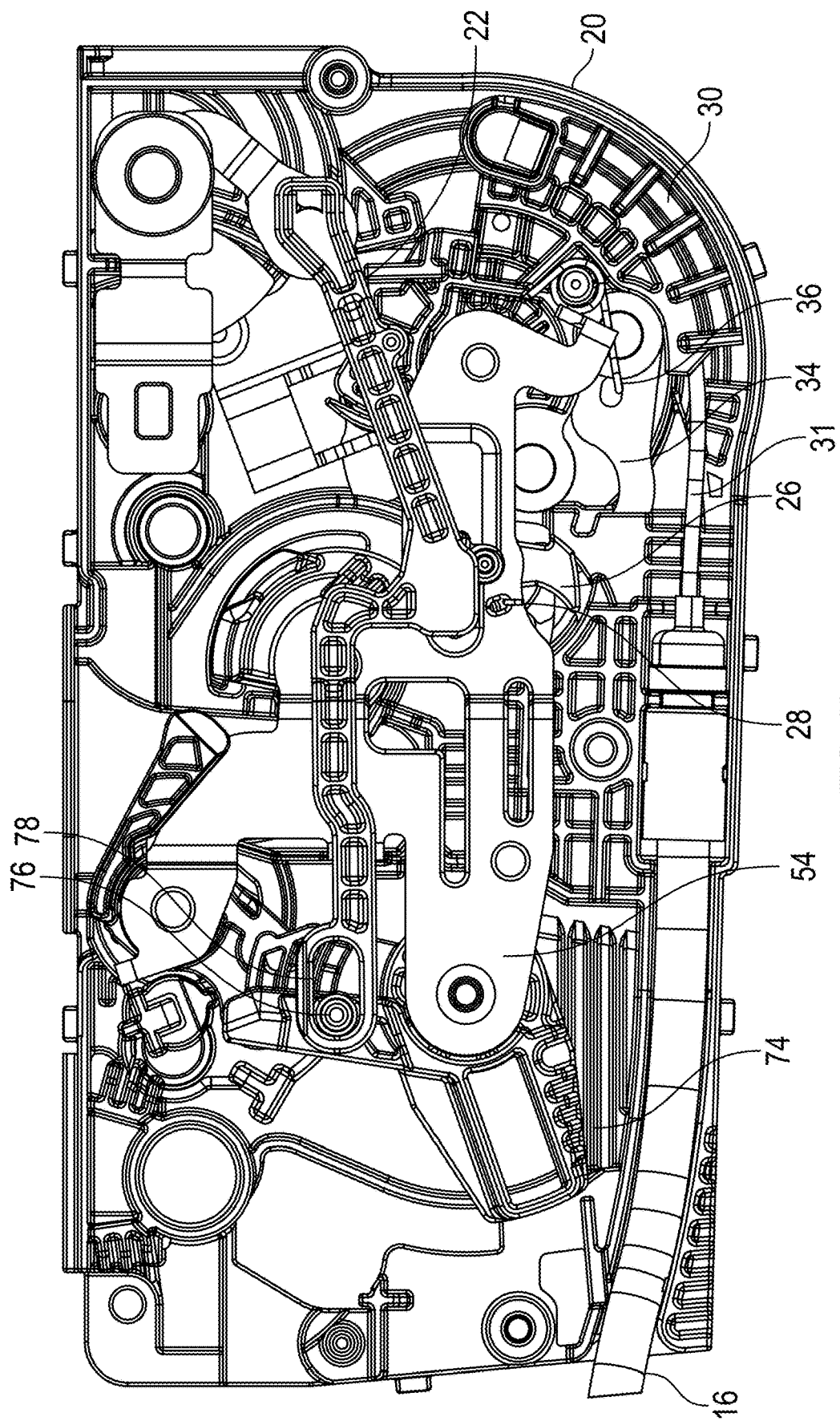
Figure 13:
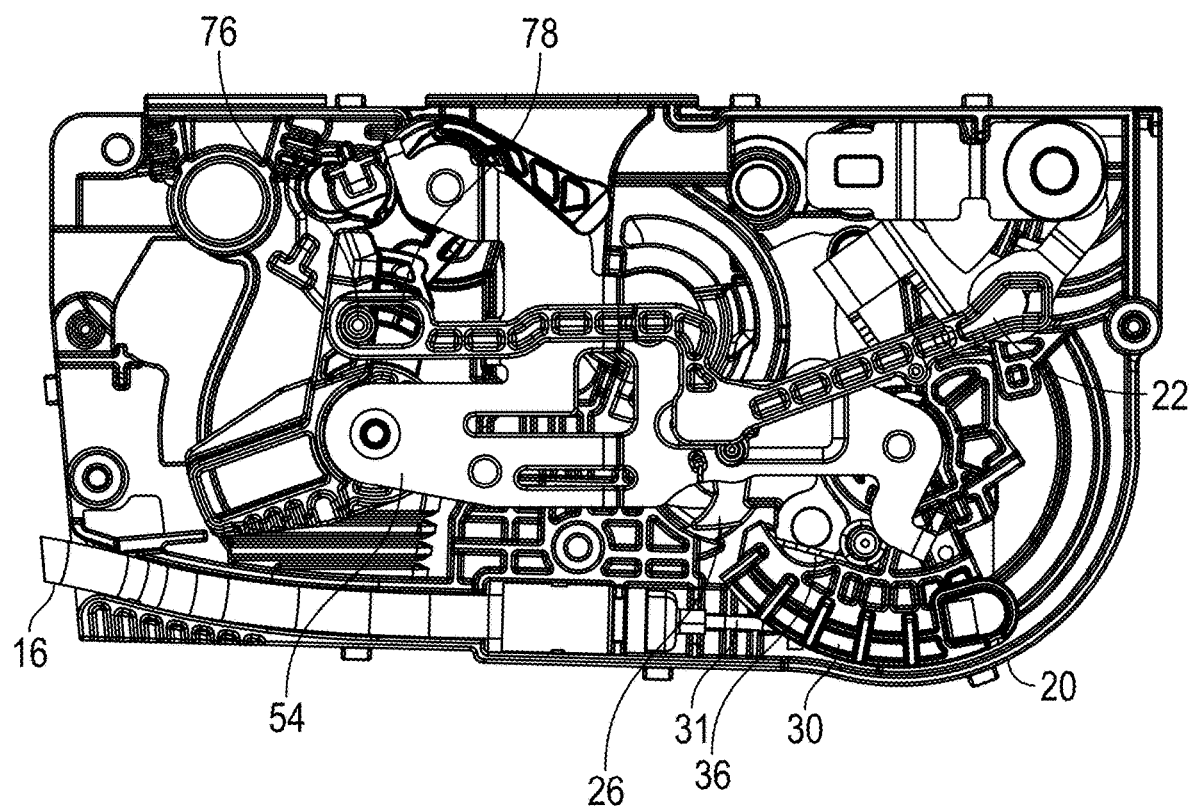

Referring now to FIGS. 11-13, the override link 22 is moved in the direction of arrow 58. Due to this movement of the override link 22 in the direction of arrow 58, the clutch lever 26 is now moved into a position to prevent the biasing force of push out lever spring 36 from causing the push out lever 34 to travel along the bypass path and instead the push out lever 34 will contact the claw 52. This position of the clutch lever 26 may be referred to a non bypass position or second position and the position of the clutch lever 26 position illustrated in at least FIGS. 2, 9, 9A, 10, 10A may be referred to a bypass position or first position.

Figure 14:
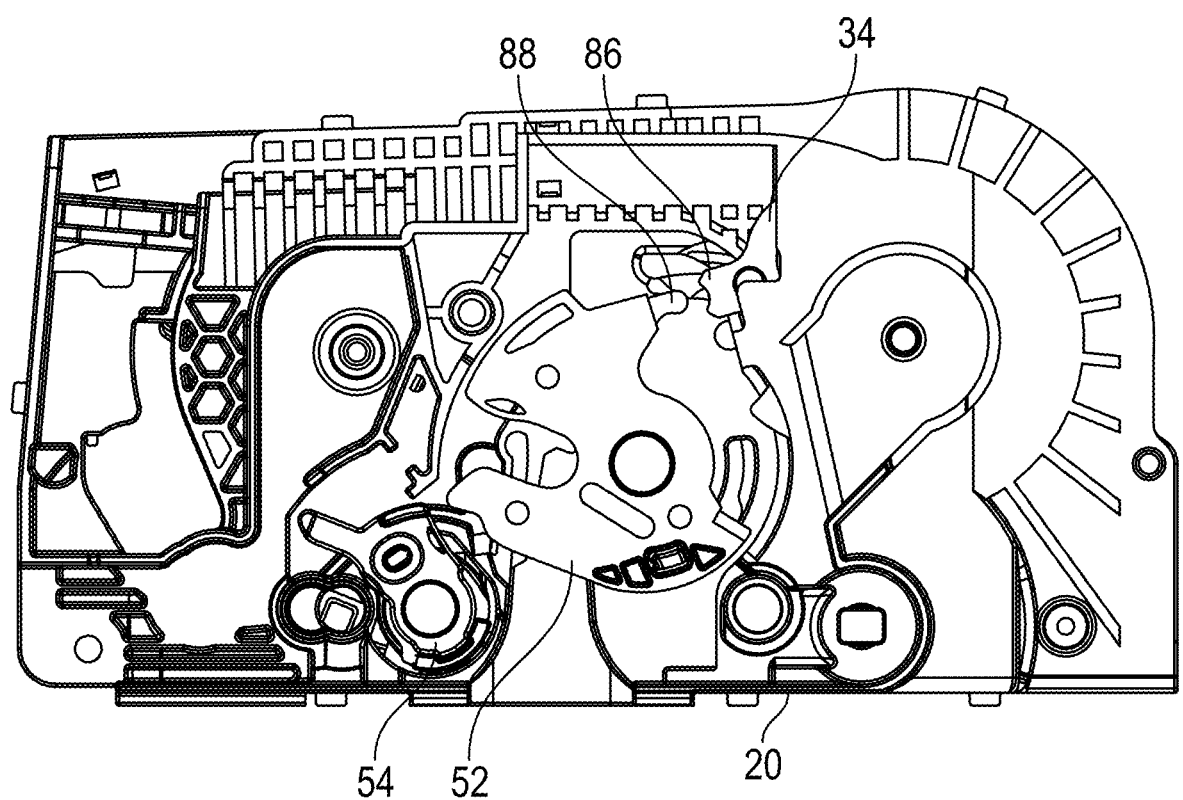
Figure 15:
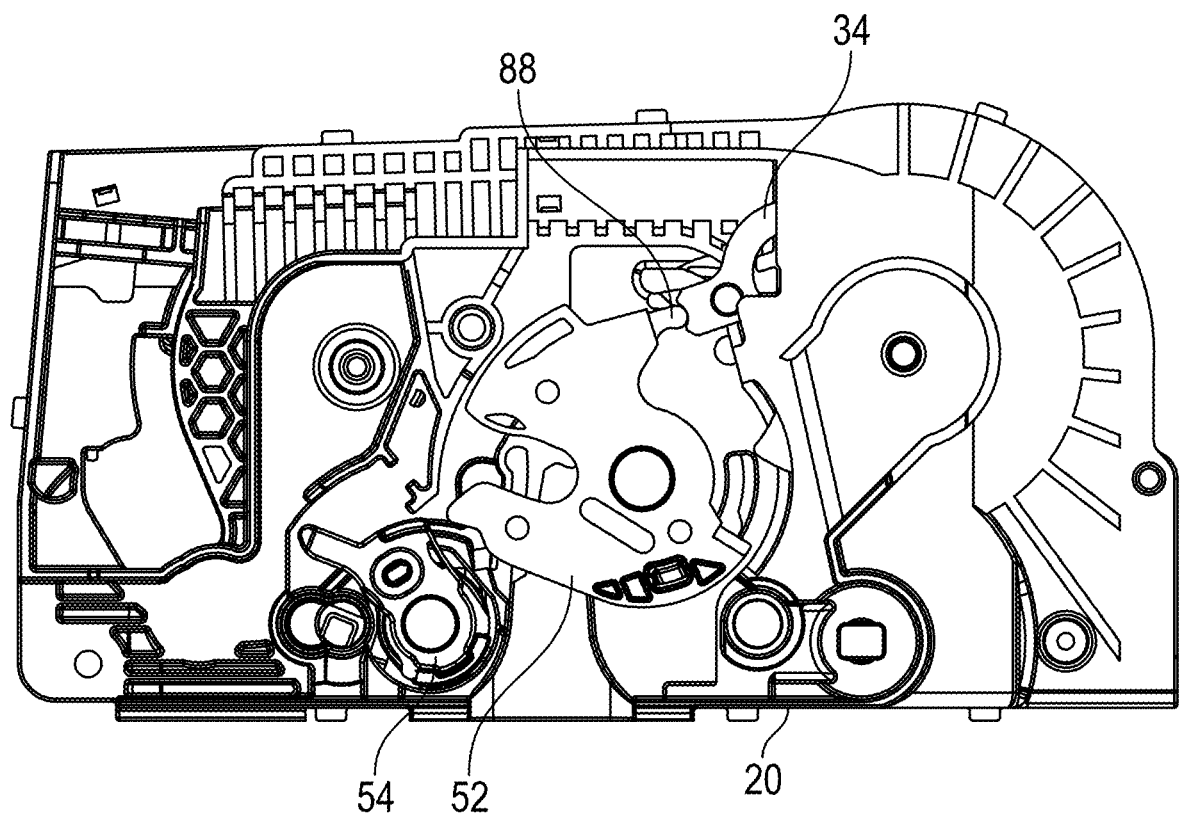
Figure 16:
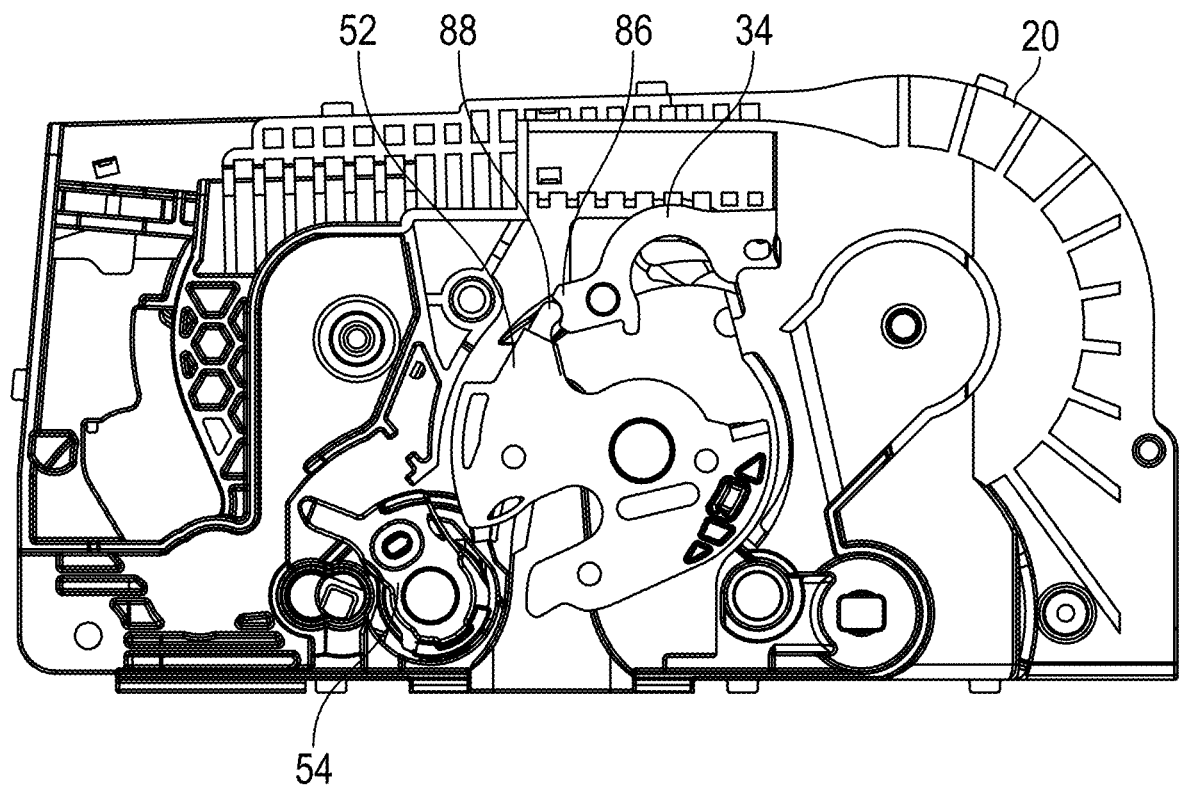
Figure 16A:
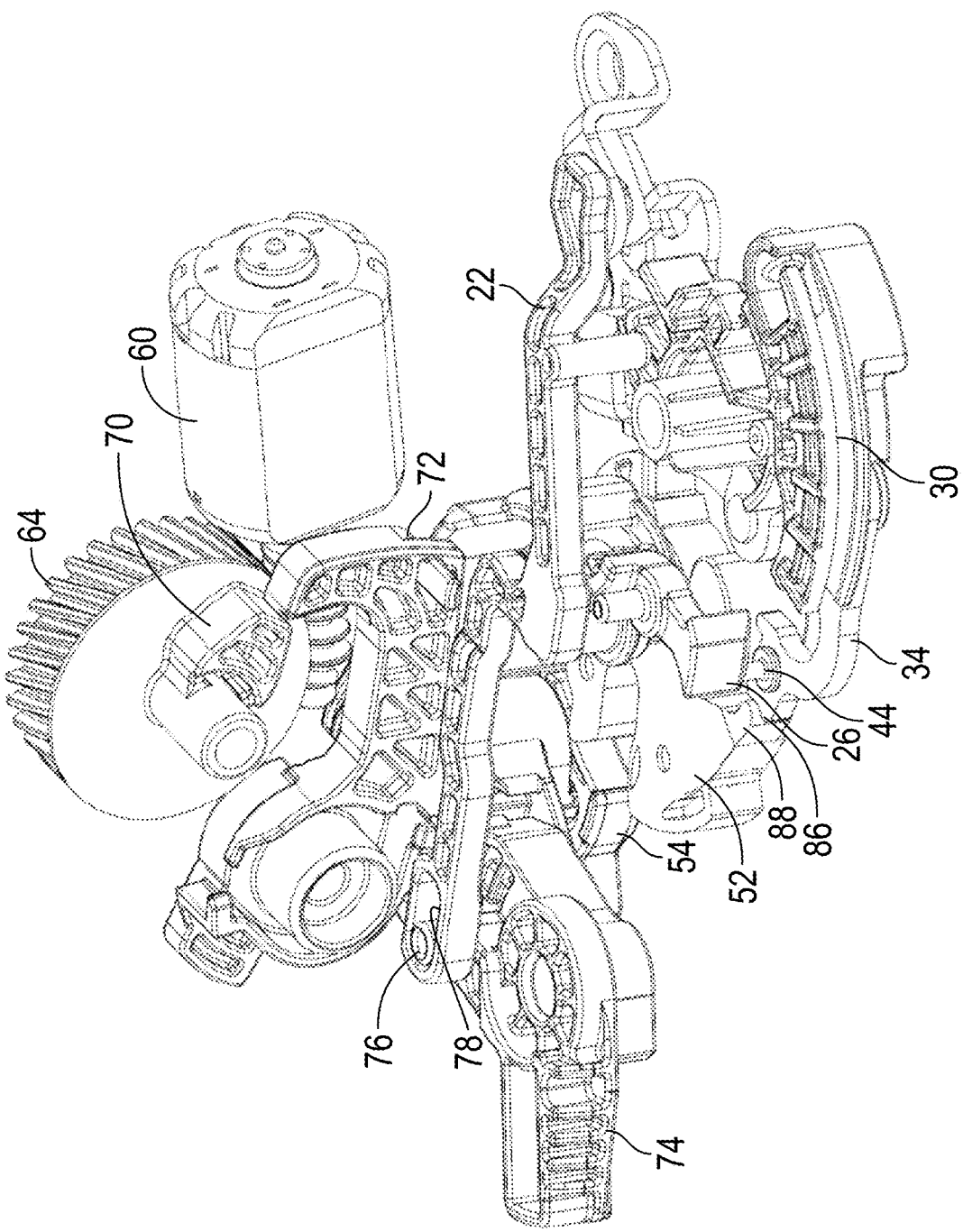
Figure 16B:
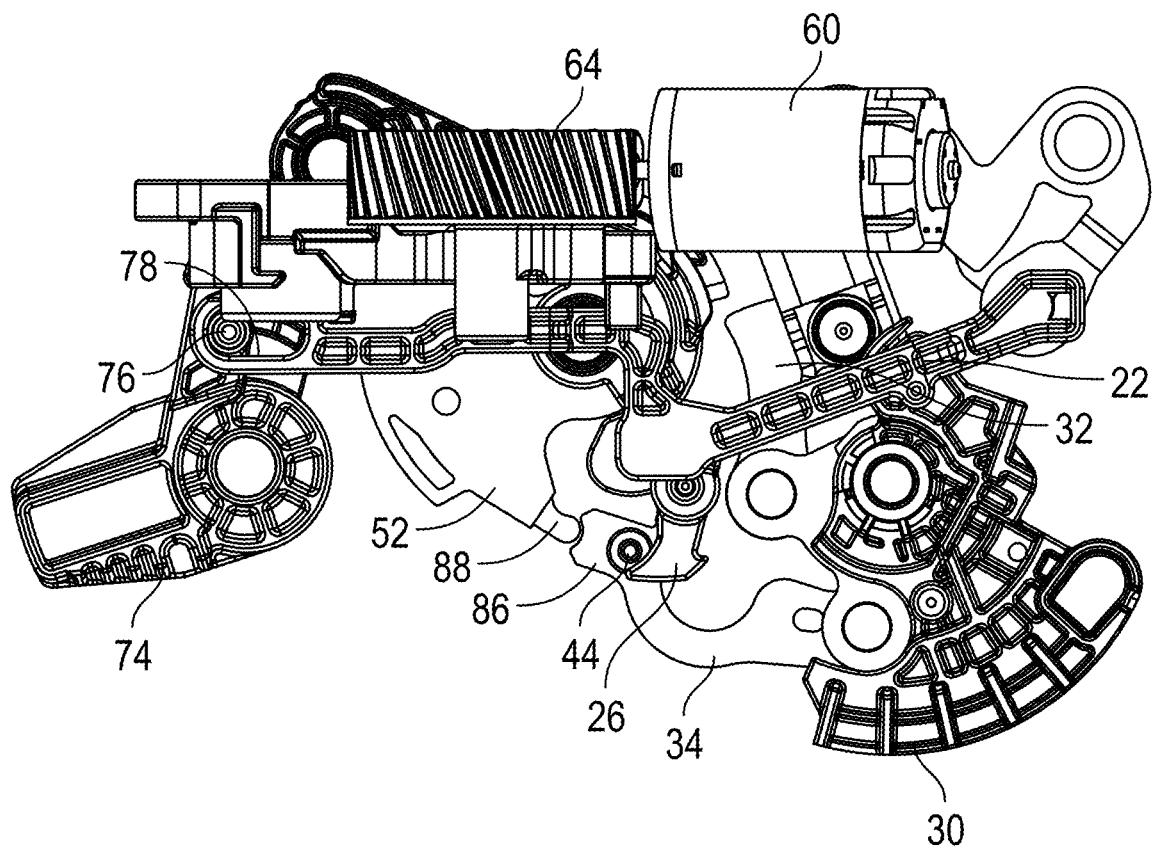
Figure 17:
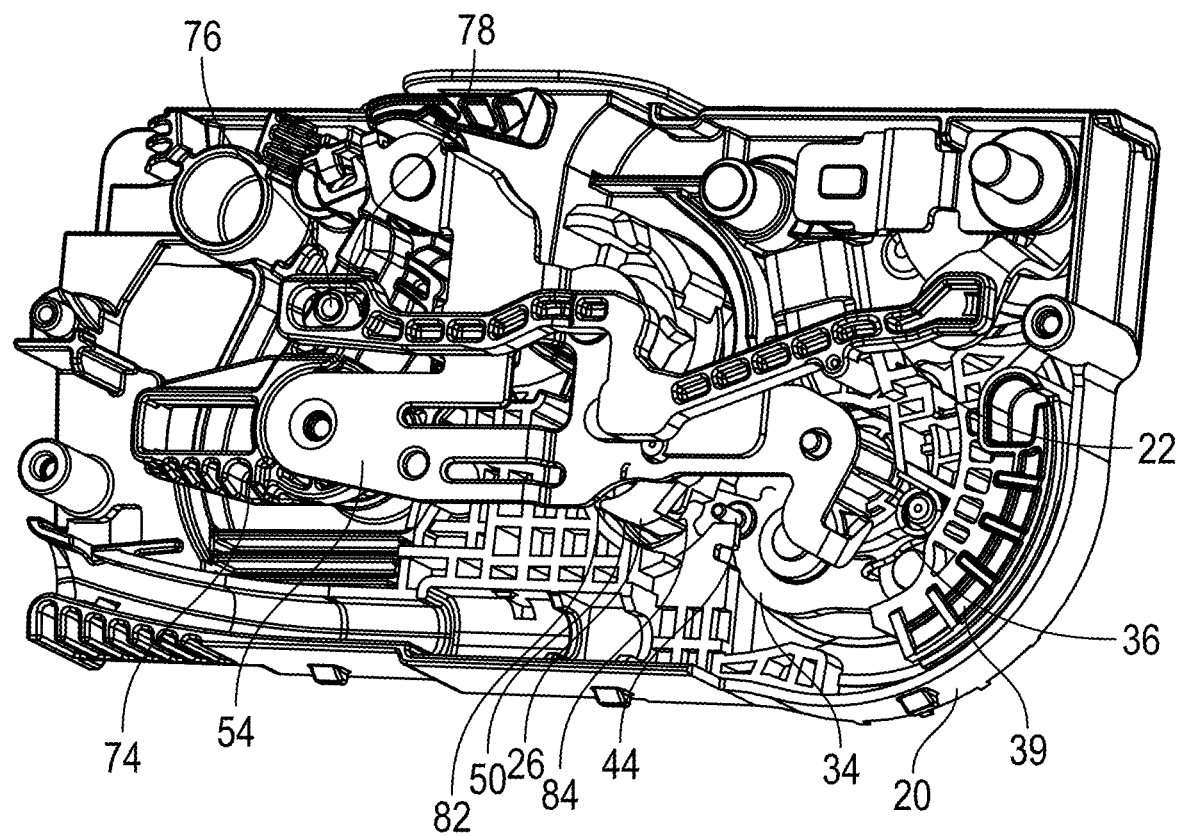
FIGS. 17 and 17A illustrate portions of the vehicle latch in accordance with the present disclosure.
Figure 17A:
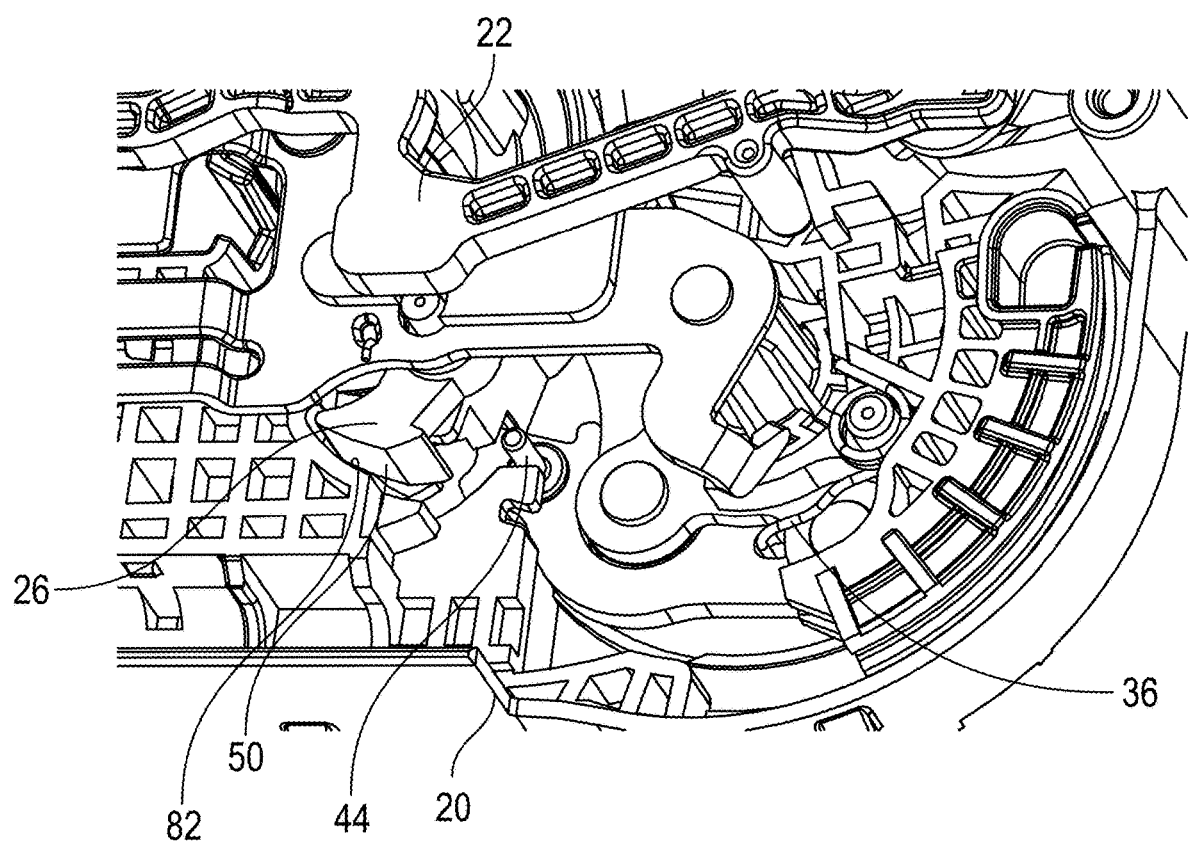
Figure 18:
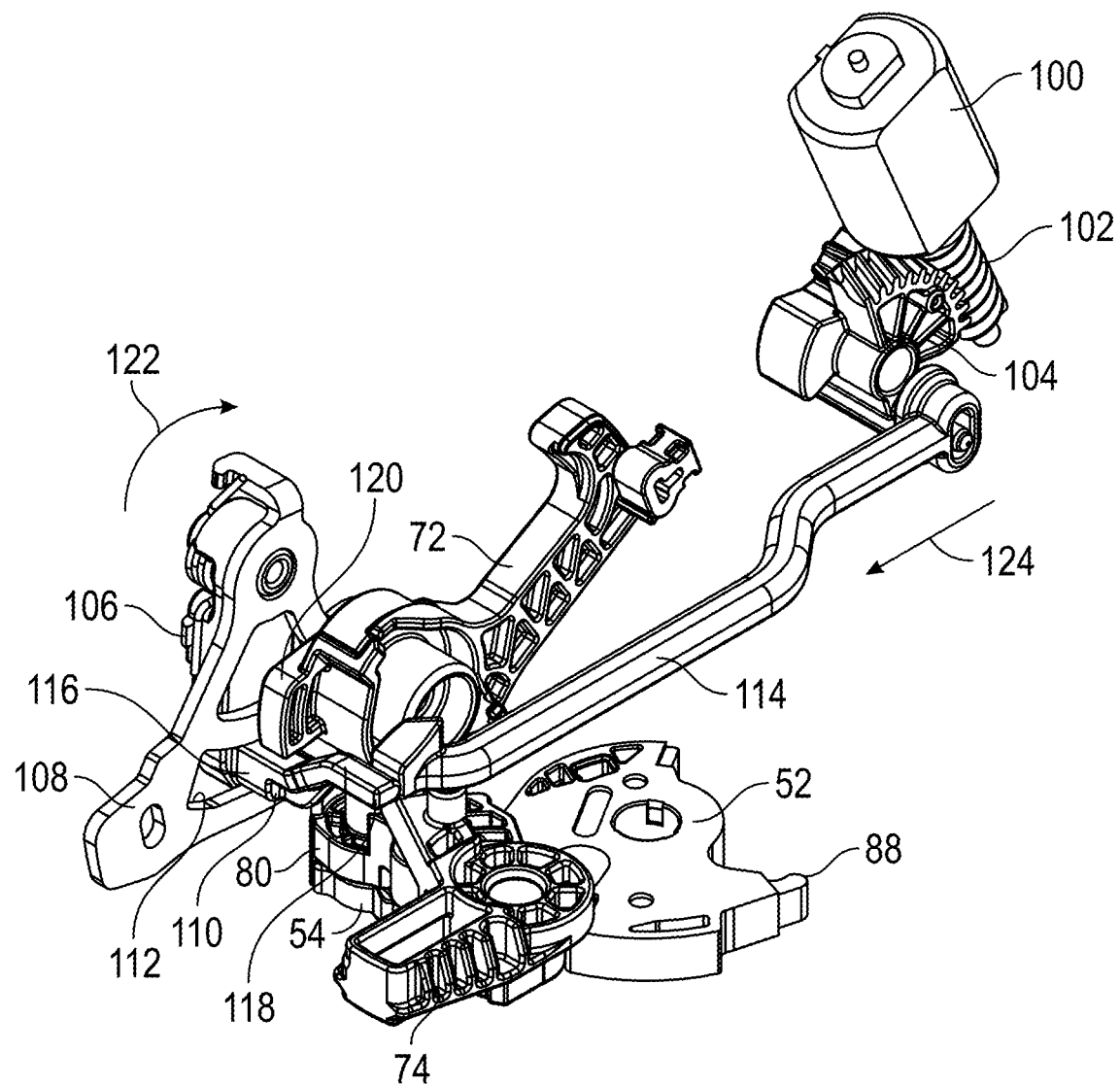
FIGS. 18-21 illustrate a power child lock function in accordance with the present disclosure.
Figure 19:
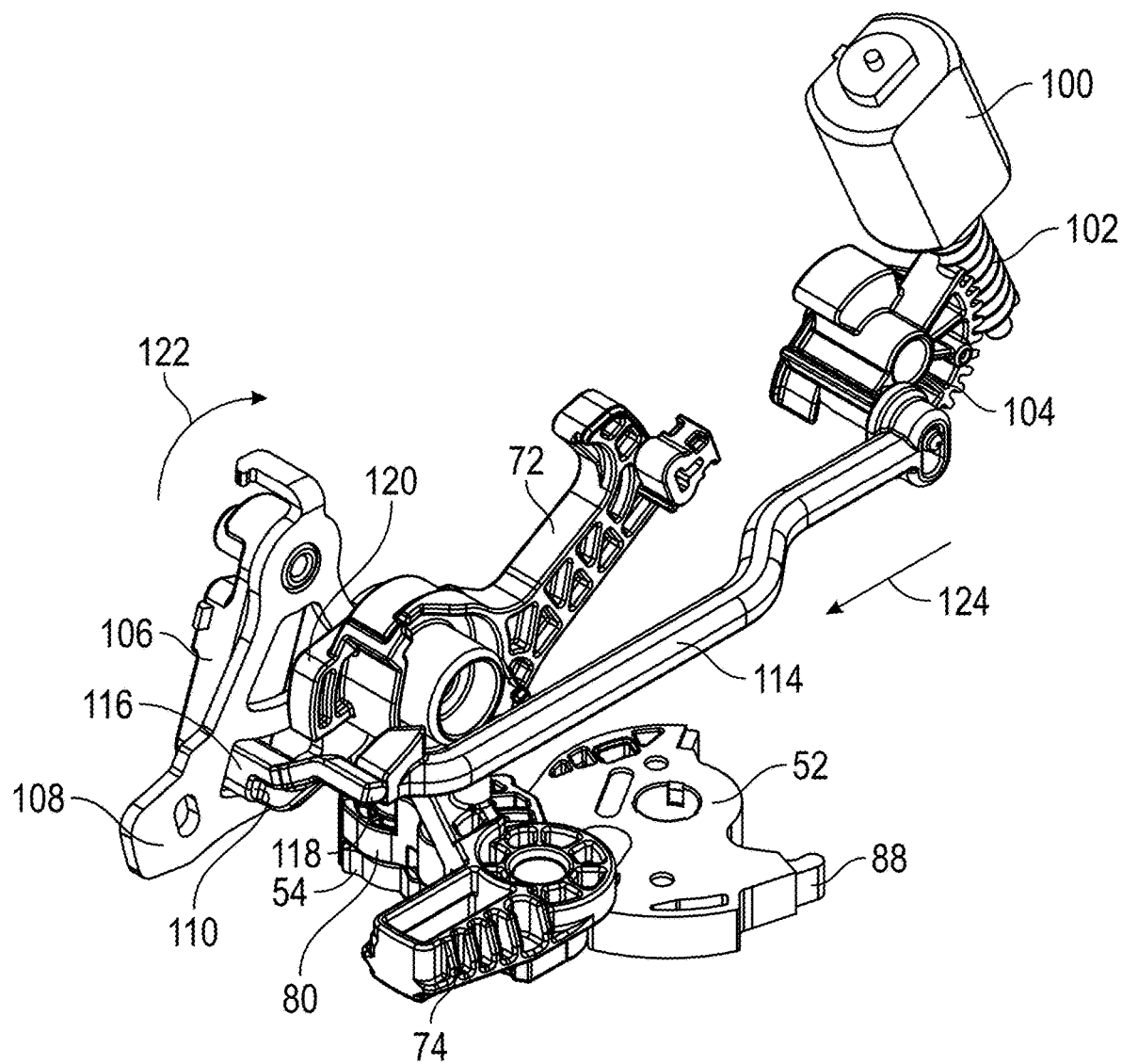
Figure 20:
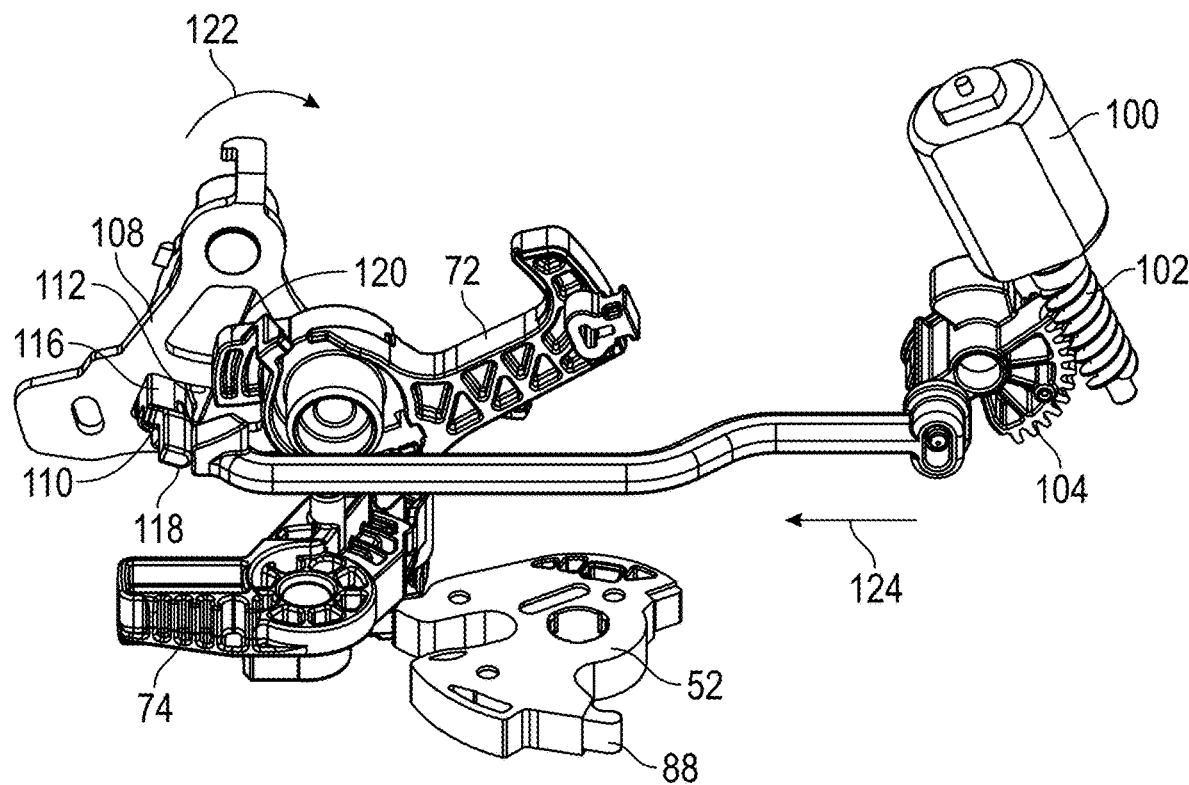
Figure 21:
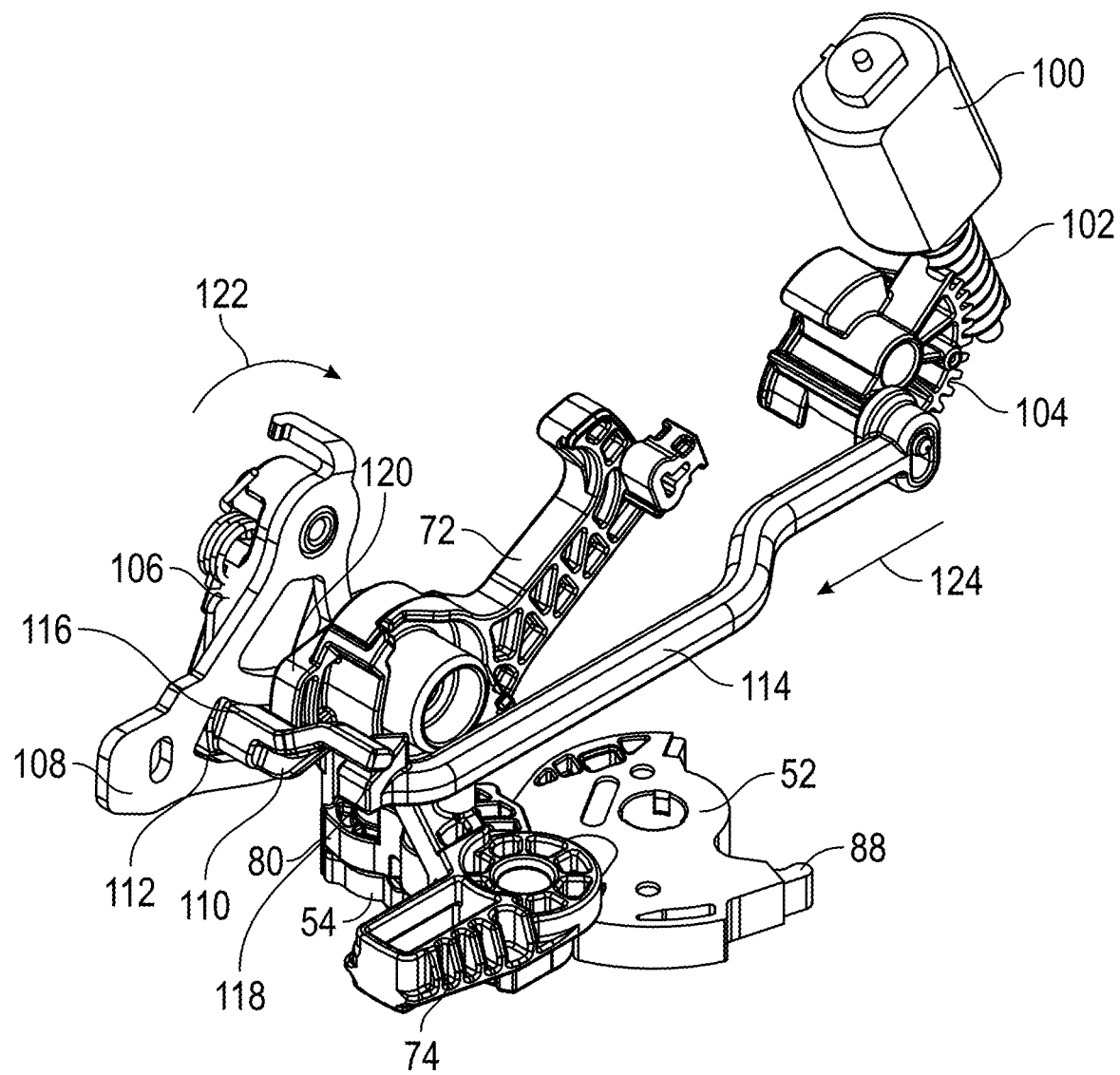

Referring now to FIGS. 11-16B, movement of the override link 22 in the direction of arrow 58 is facilitated by a power release operation wherein a motor 60 rotates a worm 62 that rotates a power release gear 64 which has a cam feature 70 that contacts and rotates a power release lever 72. The power release lever 72 is operatively coupled to a pawl release lever 74. The pawl release lever 74 has a protrusion 76 that is received within an opening 78 of the override link 22. The pawl release lever 74 is operably coupled to a pawl lifter 80 which is operably coupled to the pawl 54. As such, and when the pawl release lever 74 is rotated by the power release lever 72 the pawl 54 is in the position illustrated in at least FIGS. 14 and 15. However and as illustrated in FIGS. 14 and 15, the claw 52 is still in the closed or primary position. This may be due to the fact that the vehicle door the vehicle latch 12 is associated with is frozen or stuck (as mentioned above).

If this situation occurs, the claw 52 of the vehicle latch 12 can be moved into the open position by activating the remote cinching actuator 14 such that the cinching lever 30 can be rotated by cable 31 as illustrated in at least FIGS. 12 and 13. However and now that the override link 22 has been moved in the direction of arrow 58. The clutch lever 26 is moved to the non bypass position or second position. This is due to the fact that the movement of the override link 22 has overcome the biasing force of clutch spring 28 (it being understood that clutch spring biases the clutch lever 26 into the bypass position or first position of the clutch lever) due to the movement of the override link 22 in the direction of arrow 58 and the clutch lever 26 is rotated into the non bypass position or second position. When the clutch lever 26 is in the non bypass position or second position and cinching lever 30 is rotated in a clockwise direction with respect to the views illustrated in at least FIGS. 11-13, the pivot or feature 44 will contact a surface 84 of the clutch lever 26 and thus, the push out lever 34 will not be rotated into the bypass path by push out lever spring 36.

As such and as the cinching lever 30 rotates a distal end 86 of the push out lever 34 will contact a tab or blank 88 of the claw 52 and the rotational force of the cinching lever 30 will be applied to the claw 52 in order to move it towards the open position. See at least FIGS. 15 and 16. The force applied to the claw 52 by the push out lever 34 can be used to break a frozen condition where the door the vehicle latch 12 is secured to is frozen in a closed position. The distal end 86 of the push out lever 34 may have a curved surface configured to engage a curved surface of the tab or blank 88.

In one non-limiting embodiment of the present disclosure and for providing the power assist for opening of the vehicle latch 12, the actuation of the remote cinching actuator 14 only occurs when the pawl 54 is in the disengaged position and the claw 52 is still in the primary or closed position (see at least FIGS. 14 and 15) as such, the remote cinching actuator 14 will be activated and the push out lever 34 will contact the claw 52 and push it from the primary position towards the open position. The activation of the remote cinching actuator 14 will occur when a first switch determines that the pawl 54 is in the disengaged position and a second switch determines that the claw 52 is still in the primary position. The first switch and the second switch are each operably coupled to a controller that is operably coupled to motor of the remote cinching actuator 14.

Accordingly, the remote cinching actuator 14 may perform two functions 1) where the claw 52 is cinched closed into the primary position from the secondary position or 2) where the claw is pushed open from the primary position. The type of activity applied by the remote cinching actuator 14 will be based upon the position of the clutch lever 26, which corresponds to the position of the pawl 54.

Referring now to FIGS. 2 and 18-21, an alternative embodiment of the present disclosure is illustrated. Here the vehicle latch 12 includes a power child lock feature. It being understood, that the vehicle latch 12 may be configured to have the power child lock feature in combination with the remote cinching actuator 14 with bypass and non-bypass operation to provide cinching and/or assisted opening or the remote cinching actuator 14 with bypass and non-bypass operation to provide cinching and/or assisted opening may be exclusive to the vehicle latch 12. In other words, various embodiments of the present disclosure contemplate a vehicle latch 12 with only the remote cinching actuator 14 with bypass and non-bypass operation to provide cinching and/or assisted opening and no power child lock features.

As illustrated in FIGS. 2 and 18-21, a motor 100 provides a driving force to a worm 102 that is operably coupled to a sector gear 104 that is pivotally mounted to an actuator housing 104 of the vehicle latch 12. The actuator housing 104 being secured to the latch housing 20 or alternatively, the actuator housing 104 and latch housing 20 are formed together as a single component.

A child bypass lever or bypass lever 106 is pivotally mounted to an inside release lever 108. The inside release lever 108 is also pivotally mounted to the actuator housing 104. The child bypass lever 106 has an arm portion 110 that passes through an opening 112 in the inside release lever 108. The arm portion 110 is operably coupled to a child lock link 114 and the child lock link 114 is operably coupled to the sector gear 104 at an opposite end. The arm portion 110 has a mid portion 116 and a distal end portion 118. The distal end portion 118 engages the child lock link 114 and the mid portion 116 engages a tab 120 of the power release lever 72.

As such, and when the child bypass lever 106 is in a first position (illustrated in FIG. 18) the mid portion 116 will contact the tab 120 of the power release lever 72 when the inside release lever 108 is rotated in the direction of arrow 122 thereby causing the power release lever 72 to rotate in the direction of arrow 122, which in turn pawl rotates the pawl release lever 74 that rotates pawl lifter 80 which rotates the pawl 54. In other words, this movement will open the vehicle latch 12.

If on the other hand, motor 100 is activated and the sector gear 104 is rotated, the child lock link 114 will move in the direction of arrow 124 and the child bypass lever 106 is rotated in the direction of arrow 122. This causes arm portion 110 to move in opening 112 such that the mid portion 116 of the arm portion 110 will not contact the tab 120 of the power release lever 72 when the inside release lever 108 is rotated in the direction of arrow 122. See FIGS. 19-21. As such and in this position, operation of the inside release lever 108 will not open the vehicle latch 12.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A vehicle latch assembly, comprising:
a remote cinching actuator; and
a vehicle latch, the vehicle latch comprising:
a latch housing;
a claw pivotally mounted to the latch housing;
a cinching lever pivotally mounted to the latch housing;
a push out lever pivotally mounted to the cinching lever;
an actuator housing secured to the latch housing;
an inside release lever pivotally mounted to the actuator housing;
a bypass lever pivotally mounted to the inside release lever, the bypass lever movable between a first position and a second position with respect to the inside release lever;
a power release lever pivotally mounted to the actuator housing;

a pawl, the power release lever being operably coupled to the pawl wherein movement of the power release lever causes the pawl move between an engaged position and a disengaged position, the pawl preventing rotation of the claw when the pawl is in the engaged position and the pawl does not prevent rotation of the claw when the pawl is in the disengaged position;

wherein the bypass lever has an arm portion that passes through an opening in the inside release lever, the arm portion having a mid portion and a distal end portion, the mid portion engages a tab of the power release lever when the bypass lever is in the first position such that movement of the inside release lever causes movement of the power release lever and the pawl and the mid portion does not engage the tab of the power release lever when the bypass lever is in the second position such that movement of the inside release lever does not cause movement of the power release lever and the pawl;

a sector gear pivotally mounted to the actuator housing;

a child lock link operably coupled to the distal end portion at one end the sector gear at an opposite end, wherein movement of the sector gear causes the bypass lever to move between the first position and the second position; and wherein the remote cinching actuator is operably coupled the cinching lever by a cable, wherein actuation of the remote cinching actuator causes rotation of the cinching lever and during rotation of the cinching lever, the push out lever travels in one of a bypass path wherein the push out lever does not contact the claw and a push out path wherein the push out lever contacts the claw and provides an opening force to the claw.

2. The vehicle latch assembly as in claim 1, further comprising a motor operably coupled to the sector gear, wherein actuation of the motor causes movement of the sector gear.

3. The vehicle latch assembly as in claim 1, wherein the push out lever is spring biased towards the bypass path by a push out lever spring.

4. The vehicle latch assembly as in claim 1, wherein the vehicle latch further comprises a clutch lever, the clutch lever being movable between a bypass position and a non bypass position, wherein when the clutch lever is in the non bypass position the clutch lever causes the push out lever to travel in the push out path when the cinching lever is rotated.

5. The vehicle latch assembly as in claim 4, wherein the clutch lever is spring biased into the bypass position by a clutch lever spring.

6. The vehicle latch assembly as in claim 5, wherein the push out lever is spring biased towards the bypass path by a push out lever spring.

7. The vehicle latch assembly as in claim 6, wherein the push out lever further comprises a feature that engages the clutch lever when the clutch lever is in the non bypass position in order to guide the push out lever into the push out path.

8. The vehicle latch assembly as in claim 7, wherein the vehicle latch further comprises an override link, the override link being operably coupled to the pawl such that movement of the pawl causes movement of the override link and the override link is operably coupled to the clutch lever such that when the pawl is in the disengaged position the clutch lever is in the non bypass position due to movement of the override link.

9. The vehicle latch assembly as in claim 8, wherein the clutch lever has a tab that is received within a recess of the override link such that as the override link is moved the clutch lever will rotate between the non bypass position and the bypass position.

10. The vehicle latch assembly as in claim 8, wherein the clutch lever spring is secured to the override link at one end and the clutch lever at another end.

11. The vehicle latch assembly as in claim 10, wherein the push out lever spring is secured to the cinching lever at one end and the push out lever at another end.

12. The vehicle latch assembly as in claim 6, wherein the push out lever spring is secured to the cinching lever at one end and the push out lever at another end.

13. The vehicle latch assembly as in claim 8, wherein the cinching lever further comprises a cinch link pivotally mounted to the cinching lever, wherein the cinch link contacts the claw and provides a closing force to the claw when the cinching lever is rotated and the claw is in a secondary position and the pawl is in the engaged position.

14. The vehicle latch assembly as in claim 9, wherein the clutch lever has a guiding feature that contacts a portion of the latch housing when the pawl is in the engaged position such that the clutch lever cannot rotate into the non bypass position from the bypass position.

15. The vehicle latch assembly as in claim 14, wherein the guiding feature does not contact the portion of the latch housing when the pawl is in the disengaged position such that the clutch lever can rotate into the non bypass position from the bypass position.

16. A method opening a vehicle latch of a vehicle latch assembly, comprising:

actuating a remote cinching actuator of the vehicle latch assembly when a pawl of the vehicle latch is in a disengaged position with respect to a claw of the vehicle latch and the claw of the vehicle latch is in a latched position, wherein the remote cinching actuator is operably coupled a cinching lever of the vehicle latch by a cable and actuation of the remote cinching actuator causes rotation of the cinching lever and during rotation of the cinching lever, a push out lever rotatably mounted to the cinching lever travels in a push out path wherein the push out lever contacts the claw and provides an opening force to the claw; and moving a bypass lever pivotally mounted to an inside release lever of the vehicle latch between a first position and a second position with respect to the inside release lever, wherein the bypass lever has an arm portion that passes through an opening in the inside release lever, the arm portion having a mid portion and a distal end portion, the mid portion engages a tab of a power release lever of the vehicle latch such that when the bypass lever is in the first position, movement of the inside release lever causes movement of the power release lever and a pawl of the vehicle latch and the mid portion does not engage the tab of the power release lever when the bypass lever is in the second position such that movement of the inside release lever does not cause movement of the power release lever and the pawl, the power release lever being operably coupled to the pawl such that movement of the power release lever causes the pawl move between an engaged position and a disengaged position, the pawl preventing rotation of the claw when the pawl is in the engaged position and the pawl does not prevent rotation of the claw when the pawl is in the disengaged position.

17. The method of claim 16, wherein actuation of the remote cinching actuator when the pawl of the vehicle latch is in an engaged position with respect to the claw of the vehicle latch causes rotation of the cinching lever and during rotation of the cinching lever, the push out lever rotatably mounted to the cinching lever travels in a bypass path wherein the push out lever does not contact the claw.

18. The method of claim 17, wherein actuation of the remote cinching actuator when the pawl of the vehicle latch is in the engaged position with respect to the claw of the vehicle latch and the claw is in a secondary position where the pawl contacts the claw causes rotation of the cinching lever and during rotation of the cinching lever, a cinch link pivotally mounted to the cinching lever contacts the claw and rotates the claw into a primary position.

19. The method of claim 17, wherein the push out lever is spring biased towards the bypass path by a push out lever spring.

20. The method of claim 16, wherein the vehicle latch further comprises a clutch lever, the clutch lever being movable between a bypass position and a non bypass position, wherein when the clutch lever is in the non bypass position the clutch lever causes the push out lever to travel in the push out path when the cinching lever is rotated and wherein the clutch lever is spring biased into the bypass position by a clutch lever spring.

* * * * *